US010712916B2

(12) United States Patent
Waldman et al.

(10) Patent No.: US 10,712,916 B2
(45) Date of Patent: *Jul. 14, 2020

(54) METHODS AND SYSTEMS FOR DISPLAYING TEXT USING RSVP

(71) Applicant: Spritz Holding LLC, Park City, UT (US)

(72) Inventors: Francis Abbott Waldman, Stoneham, MA (US); Maik Steffen Maurer, Stoneham, MA (US); Oleg Skrypnyuk, Munich (DE)

(73) Assignee: Spritz Holding LLC, Park City, UT (US)

( * ) Notice: Subject to any disclaimer, the term of this patent is extended or adjusted under 35 U.S.C. 154(b) by 464 days.

This patent is subject to a terminal disclaimer.

(21) Appl. No.: 15/495,737

(22) Filed: Apr. 24, 2017

(65) Prior Publication Data

US 2017/0228132 A1 Aug. 10, 2017

Related U.S. Application Data

(60) Continuation of application No. 13/973,835, filed on Aug. 22, 2013, now Pat. No. 9,632,661, which is a
(Continued)

(51) Int. Cl.
*G06F 3/0481* (2013.01)
*G06F 16/951* (2019.01)
(Continued)

(52) U.S. Cl.
CPC ........ *G06F 3/04842* (2013.01); *G06F 3/0482* (2013.01); *G06F 3/04817* (2013.01); *G06F 16/9038* (2019.01); *G06F 16/951* (2019.01)

(58) Field of Classification Search
CPC ..................... G06F 17/214; G06F 17/30719
See application file for complete search history.

(56) References Cited

U.S. PATENT DOCUMENTS 4,845,645 A 7/1989 Matin et al.
4,932,416 A 6/1990 Rosenfeld
(Continued)

FOREIGN PATENT DOCUMENTS

CA 2 619 015 A1 8/2009
CN 1461435 A 12/2003
(Continued)

OTHER PUBLICATIONS

Applying the Rapid Serial Visual Presentation Technique to Small Screens Karin Sicheritz Uppsala University (Year: 2000).*
(Continued)

*Primary Examiner* — William L Bashore
*Assistant Examiner* — Nathan K Shrewsbury
(74) *Attorney, Agent, or Firm* — Mauriel Kapouytian Woods LLP; Lana Akopyan; Michael Mauriel

(57) ABSTRACT

Various embodiments are disclosed that relate to serially displaying text on an electronic display. In some embodiments, a user device displays a notification marker/icon representing a notification event associated with an application by displaying the notification marker/icon with an icon representing the application. The notification marker/icon further represents a presence of content that is displayable using RSVP. The communications device receives a user interface action to select the notification event, and in response to the user interface action, displays textual content associated with the notification event in a designated display area using RSVP.

30 Claims, 28 Drawing Sheets

Related U.S. Application Data division of application No. 13/730,163, filed on Dec. 28, 2012, now abandoned.

(51) Int. Cl.
*G06F 16/9038* (2019.01)
*G06F 3/0484* (2013.01)
*G06F 3/0482* (2013.01)

(56) References Cited

U.S. PATENT DOCUMENTS

| | | | |
|---|---|---|---|
| 5,137,027 A | 8/1992 | Rosenfeld | |
| 5,873,109 A | 2/1999 | High | |
| 5,995,101 A | 11/1999 | Clark et al. | |
| 6,018,774 A | 1/2000 | Mayle et al. | |
| 6,067,069 A | 5/2000 | Krause | |
| 6,078,935 A | 6/2000 | Nielsen | |
| 6,098,085 A | 8/2000 | Blonder et al. | |
| 6,113,394 A | 9/2000 | Edgar | |
| 6,130,968 A | 10/2000 | McIan et al. | |
| 6,292,176 B1 | 9/2001 | Reber et al. | |
| 6,353,824 B1 | 3/2002 | Boguraev et al. | |
| 6,409,513 B1 | 6/2002 | Kawamura et al. | |
| 6,515,690 B1 | 2/2003 | Back et al. | |
| 6,553,373 B2 | 4/2003 | Boguraev et al. | |
| 6,568,939 B1 | 5/2003 | Edgar | |
| 6,652,283 B1 | 11/2003 | Van Schaack et al. | |
| 6,686,928 B1 | 2/2004 | Reber et al. | |
| 6,704,698 B1 | 3/2004 | Paulsen, Jr. et al. | |
| 6,816,174 B2 | 11/2004 | Tiongson et al. | |
| 6,865,572 B2 | 3/2005 | Boguraev et al. | |
| 6,925,613 B2 | 8/2005 | Gibson | |
| 7,139,006 B2 | 11/2006 | Wittenburg et al. | |
| 7,159,172 B1 | 1/2007 | Bentley et al. | |
| 7,173,621 B2 | 2/2007 | Reber et al. | |
| 7,272,787 B2 | 9/2007 | Nakamura et al. | |
| 7,365,741 B2 | 4/2008 | Chincholle et al. | |
| 7,395,500 B2 | 7/2008 | Whittle et al. | |
| 7,404,142 B1 | 7/2008 | Tischer | |
| 7,454,717 B2 | 11/2008 | Hinckley et al. | |
| 7,475,334 B1 | 1/2009 | Kermani | |
| 7,478,322 B2 | 1/2009 | Konttinen | |
| 7,549,114 B2 | 6/2009 | Bederson et al. | |
| 7,598,977 B2 | 10/2009 | Ryall et al. | |
| 7,607,088 B2 | 10/2009 | Bertram et al. | |
| 7,613,731 B1 | 11/2009 | Larson | |
| 7,627,590 B2 | 12/2009 | Boguraev et al. | |
| 7,647,345 B2 | 1/2010 | Trepess et al. | |
| 7,710,411 B2 | 5/2010 | Reber et al. | |
| 7,730,397 B2 | 6/2010 | Tischer | |
| 7,783,978 B1 | 8/2010 | Andrews et al. | |
| 7,835,581 B2 | 11/2010 | Mathan et al. | |
| 7,946,707 B1 | 5/2011 | McDonald, II et al. | |
| 7,991,195 B2 | 8/2011 | Mathan et al. | |
| 7,991,920 B2 | 8/2011 | Back et al. | |
| 7,996,045 B1 | 8/2011 | Bauer et al. | |
| 8,059,136 B2 | 11/2011 | Mathan | |
| 8,069,466 B2 | 11/2011 | Shelton et al. | |
| 8,140,973 B2 | 3/2012 | Sandquist et al. | |
| 8,165,407 B1 | 4/2012 | Khosla et al. | |
| 8,209,634 B2 | 6/2012 | Klassen et al. | |
| 8,214,309 B1 | 7/2012 | Khosla et al. | |
| 8,217,947 B2 | 7/2012 | Roth | |
| 8,244,475 B2 | 8/2012 | Aguilar et al. | |
| 8,245,142 B2 | 8/2012 | Mizrachi et al. | |
| 8,249,397 B2 | 8/2012 | Wood et al. | |
| 8,265,743 B2 | 9/2012 | Aguilar et al. | |
| 8,274,592 B2 | 9/2012 | Watkins et al. | |
| 8,285,052 B1 | 10/2012 | Bhattachaiyya et al. | |
| 8,292,433 B2 | 10/2012 | Vertegaal | |
| 8,307,282 B2 | 11/2012 | Saito et al. | |
| 8,335,751 B1 | 12/2012 | Daily et al. | |
| 8,363,939 B1 | 1/2013 | Khosla et al. | |
| 8,369,652 B1 | 2/2013 | Khosla et al. | |
| 8,374,687 B2 | 2/2013 | Mathan et al. | |
| 8,418,057 B2 | 4/2013 | Knight et al. | |
| 8,458,152 B2 | 6/2013 | Fogg et al. | |
| 8,472,791 B2 | 6/2013 | Gargi | |
| 8,483,816 B1 | 7/2013 | Payton et al. | |
| 8,595,141 B2 | 11/2013 | Hao et al. | |
| 8,903,174 B2 | 12/2014 | Maurer et al. | |
| 9,087,407 B2 | 7/2015 | Koivusalo | |
| 9,154,606 B2 | 10/2015 | Tseng et al. | |
| 9,299,065 B2 | 3/2016 | Hymel et al. | |
| 9,483,109 B2 | 11/2016 | Waldman et al. | |
| 9,552,596 B2 | 1/2017 | Waldman et al. | |
| 9,632,661 B2 | 4/2017 | Waldman et al. | |
| 2002/0133521 A1 | 9/2002 | Campbell et al. | |
| 2003/0038754 A1 | 2/2003 | Goldstein et al. | |
| 2003/0184560 A1 | 10/2003 | Pierce | |
| 2004/0004632 A1 | 1/2004 | Knight et al. | |
| 2004/0024747 A1 | 2/2004 | Boguraev et al. | |
| 2004/0107195 A1 | 6/2004 | Trepess | |
| 2004/0119684 A1 | 6/2004 | Back et al. | |
| 2006/0069562 A1 | 3/2006 | Adams et al. | |
| 2007/0061720 A1 | 3/2007 | Kriger | |
| 2008/0141126 A1 | 6/2008 | Johnson et al. | |
| 2009/0066722 A1 | 3/2009 | Kriger et al. | |
| 2009/0083621 A1 | 3/2009 | Kermani | |
| 2009/0094105 A1 | 4/2009 | Gounares et al. | |
| 2010/0280403 A1 | 11/2010 | Erdogmus et al. | |
| 2011/0010611 A1 | 1/2011 | Ross | |
| 2011/0115819 A1 | 5/2011 | Hanson | |
| 2011/0117969 A1 | 5/2011 | Hanson | |
| 2012/0265758 A1 | 10/2012 | Han et al. | |
| 2012/0317498 A1 | 12/2012 | Logan et al. | |
| 2013/0100139 A1 | 4/2013 | Schliesser et al. | |
| 2013/0159850 A1 | 6/2013 | Cohn | |
| 2013/0174088 A1* | 7/2013 | Stringer | G06F 3/04812 715/800 |
| 2014/0040344 A1 | 2/2014 | Gehring et al. | |
| 2014/0186010 A1* | 7/2014 | Guckenberger | G11B 27/031 386/248 |
| 2014/0188766 A1* | 7/2014 | Waldman | G06Q 30/0255 705/400 |
| 2014/0188848 A1* | 7/2014 | Waldman | G06F 3/0484 707/722 |
| 2014/0189515 A1* | 7/2014 | Waldman | G06F 16/444 715/719 |
| 2014/0189586 A1* | 7/2014 | Waldman | G06F 16/9038 715/808 |
| 2014/0189595 A1* | 7/2014 | Waldman | G06F 3/0484 715/835 |
| 2015/0199944 A1 | 7/2015 | Maurer et al. | |
| 2016/0343171 A1 | 11/2016 | Waldman et al. | |
| 2017/0199937 A1 | 7/2017 | Waldman et al. | |

FOREIGN PATENT DOCUMENTS

| | | |
|---|---|---|
| EP | 1 162 587 A1 | 12/2001 |
| EP | 1 727 052 A1 | 11/2006 |
| EP | 2 323 357 A1 | 5/2011 |
| GB | 1 502 508 | 3/1978 |
| JP | S51-090237 | 8/1976 |
| JP | 2007-141059 A | 6/2007 |
| KR | 2002-0011933 A | 2/2002 |
| WO | WO 98/41937 A1 | 9/1998 |
| WO | WO 02/12994 A1 | 2/2002 |
| WO | WO 02/037256 A2 | 5/2002 |
| WO | WO 03/019341 A1 | 3/2003 |
| WO | WO 2006/100645 A2 | 9/2006 |
| WO | WO 2008/051510 A2 | 5/2008 |

OTHER PUBLICATIONS

Brysbaert, "Interhemispheric transfer and the processing of foveally presented stimuli," Behavioural Brain Research, 1994, vol. 64, pp. 151-161.

Brysbaert et al., "Visual Constraints in Written Word Recognition: Evidence From the Optimal Viewing Position Effect," Journal of Research in Reading, 2005, vol. 28, Issue 3, pp. 216-226.

(56) References Cited

OTHER PUBLICATIONS

Brysbaert et al., "Word skipping: Implications for theories of eye movement control in reading," Eye Guidance in Reading and Scene Perception, 1998, Chapter 6, pp. 125-147.
Clark et al., "Word Ambiguity and the Optimal Viewing Position in Reading," Preprint submitted to Elsevier Preprint, 1998, pp. 1-50.
Engbert et al., "SWIFT: A Dynamical Model of Saccade Generation during Reading," Psychological Review, 2005, vol. 112, No. 4, pp. 777-813.
Findlay et al., "Saccade target selection in visual search: the effect of information from the previous fixation," Vision Research, 2001, vol. 41, pp. 87-95.
Kliegl et al., "Tracking the Mind During Reading: The Influence of Past, Present, and Future Words on Fixation Durations," J. of Exp. Psyc., 2006, vol. 135, No. 1, pp. 12-35.
McConkie et al., "Eye Movement Control During Reading: II. Frequency of Refixating a Word," Center for the Study of Reading, 1989, Technical Report No. 469, 30 pages.
Nazir et al., "Letter visibility and word recognition: The optimal viewing position in printed words," Perception & Psychophysics, 1992, vol. 52, No. 3, pp. 315-328.
O'Regan et al., "Convenient Fixation Location Within Isolated Words of Different Length and Structure," Journal of Experimental Psychology, 1984, vol. 10, No. 2, pp. 250-257.
Rayner et al., "Asymmetry of the effective visual field in reading," Perception & Psychophysics, 1980, vol. 27, No. 6, pp. 537-544.
Rayner, "Eye Movements in Reading and Information Processing: 20 Years of Research," Psychological Bulletin, 1998, vol. 124, No. 3, pp. 372-422.
Schoonbaert et al., "Letter position coding in printed word perception: Effects of repeated and transposed letters," Language and Cognitive Processes, 2004, vol. 19, No. 3, pp. 333-367.
Staub et al., "Eye movements and on-line comprehension processes," The Oxford handbook of Psycholinguistics, 2007, Chapter 19, pp. 327-342.
Stevens et al., "Letter visibility and the viewing position effect in visual word recognition," Perception & Psychophysics, 2003, vol. 65, No. 1, pp. 133-151.
Vitu et al., "Optimal landing position in reading isolated words and continuous text," Perception & Psychophysics, 1990, vol. 47, No. 6, pp. 583-600.
Vitu, "The influence of parafoveal preprocessing and linguistic context on the optimal landing position effect," Perception & Psychophysics, 1991, vol. 50, pp. 58-75.
Bruijn et al., "RSVP Browser: Web Browsing on Small Screen Devices," Personal and Ubiquitous Computing, 2002, vol. 6, Issue 4, 9 pages.
International Search Report and Written Opinion issued in International Application No. PCT/US2013/050081 dated Oct. 31, 2013, 15 pages.
International Search Report and Written Opinion issued in International Application No. PCT/US2013/077883 dated Apr. 16, 2014, 27 pages.
Android Push Notifications, http://developer.android.com/guide/topics/ui/notifiers/notifications.html, 17 pages.
International Search Report and Written Opinion issued in International Application No. PCT/US2014/054867 dated Jan. 2, 2015, 15 pages.
"How to Display Closed Captions," posted no later than Jul. 2016, http://library.med.utah.edu/neurologicexam/html/how_to_display_closed_captions.html, 6 pages.
Extended European Search Report issued in European Patent Application No. 14842003.7 dated Jan. 5, 2017, 9 pages.
Office Action issued in European Patent Application No. 13 816 590.7 dated Feb. 15, 2017, 5 pages.
Lo, "Chinese character recognition: studies of complexity effect on recognition efficiency, spatial frequency characteristics, crowding and expertise," PhD Thesis, 2013, The University of Hong Kong, 181 pages.
Forster, "Visual perception of rapidly presented word sequences of varying complexity," Perception and Psycholophyics, 1970, vol. 8, Issue 4, pp. 215-221.
Office Action issued in Japanese Patent Application No. 2015-521810 dated May 16, 2017, 12 pages.

* cited by examiner

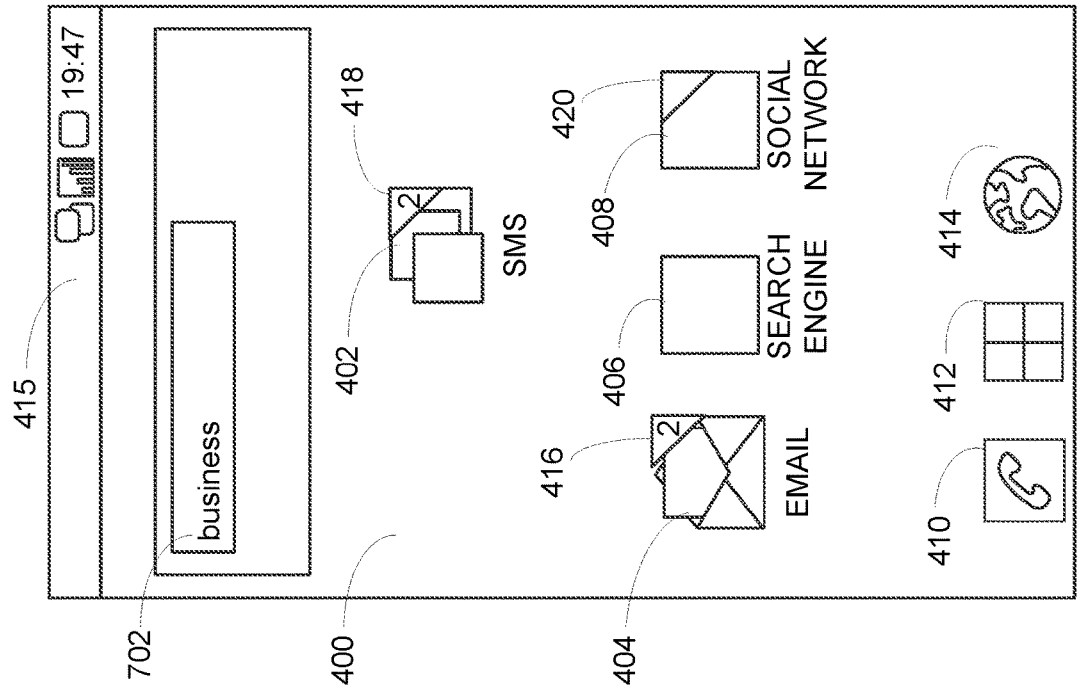
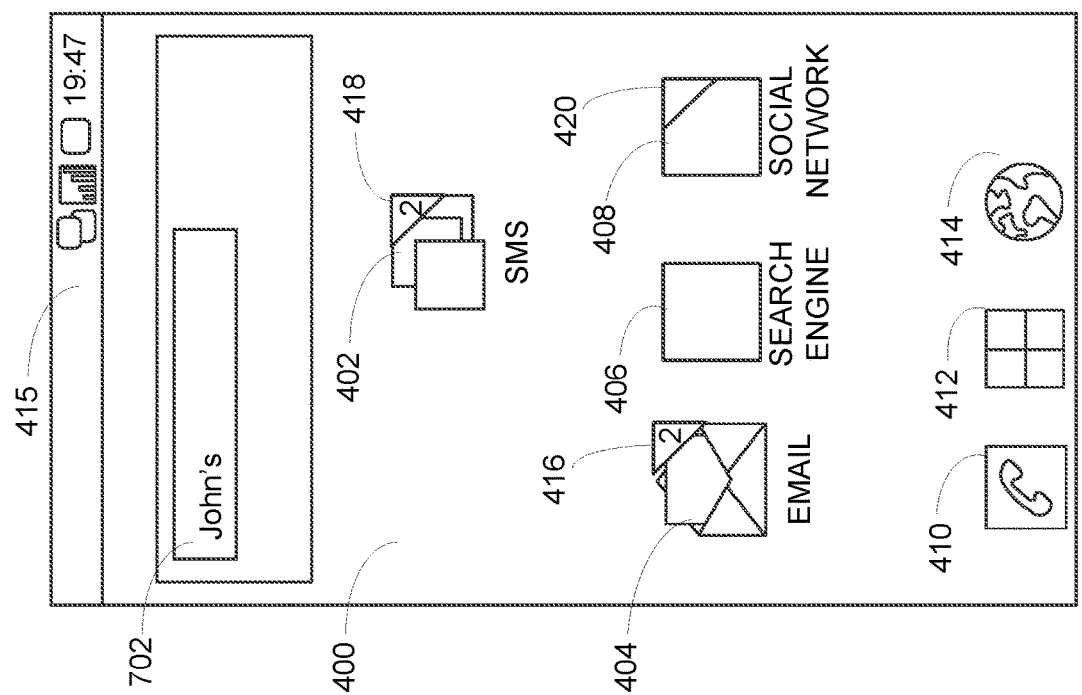

FIG. 11a
FIG. 11b

1900

| | | | | | |
|---|---|---|---|---|---|
| | | | 🔋📶⭕ 19:47 | | |
| | Why | | | | |
| 2 | | | | | |
| 3 | | | | | |
| 4 | | Product | Units Sold | Unit Price | |
| 5 | | Widgets | 3 | $50 | |
| 6 | | Ridgets | 10 | $100 | |
| 7 | | Lidgets | 5 | $20 | |
| 8 | | Kidgets | 9 | $10 | |
| 9 | | Fidgets | 3 | $60 | |
| 10 | | Zidgets | 1 | $200 ◣ | —1902 |
| 11 | | | | | |
| 12 | | | | | |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| 21 | | | | | |
| 22 | | | | | |
| 23 | | | | | |

1904 points to the "Why" box.

FIG. 19

METHODS AND SYSTEMS FOR DISPLAYING TEXT USING RSVP

This application is a continuation of U.S. patent application Ser. No. 13/973,835 filed on Aug. 22, 2013 which will issue on Apr. 25, 2017 as U.S. Pat. No. 9,632,661 and which was a divisional of U.S. patent application Ser. No. 13/730,163 filed on Dec. 28, 2012. The content of both of those applications is incorporated herein by reference in its entirety.

BACKGROUND

The present invention relates to apparatuses and methods for enabling improved display of textual content on an electronic display.

Communications devices, including PCs, smartphones, tablets, e-readers, etc. continue to grow in popularity, and have become an integral part of both personal and business communications. As a result, users continue to spend more time using their communications devices during the course of a day reading e-mails, reading web sites, sending short message service (SMS) messages, etc. The use of a communications device, and particularly a mobile communications device, for such functions, however, may present certain inconveniences to a user. For example, the display area of a mobile communications device may be limited, which may increase the time spent reading an e-mail or web site, as the user may have to scroll through multiple pages to read the entire e-mail or web site. Moreover, despite heavy technological (digital) advances, the illustration of textual information on electronic displays has not fundamentally changed. Textual information is typically displayed in lines such that the reader's eye moves sequentially from word to word.

Rapid Serial Visual Presentation (RSVP) is a method of displaying textual content in which each word of the textual content is displayed in sequential order, one at a time, at a certain display rate, at a fixed location on a display. RSVP was first introduced in the 1970s as a technique for presenting text one word at a time in a display. Many references since then have provided information on the use of RSVP in a variety of applications. Commercially available products based on RSVP include "Zap Reader" (www.zapreader.com/reader) and "Spreeder" (www.spreeder.com). Some prior methods exist for improving the effectiveness of an RSVP by varying the display time of a word in the display based on word length and word type (see, U.S. Pat. No. 6,130,968 to McIan et al. ("McIan")) and based on word frequency (see WO/37256 by Goldstein et al. ("Goldstein 2002")). While these techniques are beneficial in improving comprehension of the displayed text, new techniques and methods are needed to further increase a user's reading speed, and improve the presentation of dense content on electronic displays.

Isolated efforts have also been made to apply RSVP to particular applications (e.g., email application) in mobile communications devices (see, US 2011/0115819 to Hanson). However, the challenges and opportunities for integrating RSVP into user interfaces for increasing the density of displayable content remain largely unexplored.

SUMMARY

Previous implementations of Rapid Serial Visual Presentation (RSVP) do not address using RSVP to improve user access to information from a homescreen (e.g., a "homescreen" of a smartphone running a mobile operating system such as iOS™, Android™, or Windows Phone™ or a "desktop" screen of a PC, laptop, etc., running an operating system such as Windows™, or Mac™ OS; or a homescreen/desktop screen of an intermediate portable device such as notepad, touchpad, etc. running a corresponding operating system; all referenced herein as simply a "homescreen" for simplicity) user interface or how to best integrate RSVP into a variety of applications. Given the increasing reliance on small-screen devices (particularly mobile communication devices, but also notebook computers and other highly portable computing devices) for a variety of purposes, there is a growing need to efficiently utilize screen space within user interfaces. Moreover, even with respect to larger screen devices, there are unexplored opportunities to create more efficient interfaces by incorporating RSVP techniques. Embodiments of the invention relate to electronic interfaces that effectively utilize RSVP to improve user access to information.

In one embodiment, a communications device displays a first icon representing a notification event associated with an application by displaying the first icon with an icon representing the application. The first icon further represents a presence of content that is displayable using RSVP. The communications device receives a first user interface action to select the notification event, and in response to the first user interface action, displays textual content associated with the notification event in a designated display area using RSVP. The RSVP content may contain embedded text, a uniform resource locator (URL), or an attachment. If the user selects embedded text, the RSVP content corresponding to the embedded text may be displayed in the designated display area using RSVP. In one embodiment, if the user selects a URL, the contents of the webpage corresponding to the URL may be displayed in the designated display area using RSVP. Alternatively, the webpage may be displayed by a browser application. If the user selects an attachment, an application associated with the attachment may be launched to open the attachment. For example, if the attachment is a photo, a photo viewer application may be launched to open the photo.

In another embodiment, the communications device displays a first icon within an application interface. The first icon represents presence of textual content that is displayable using RSVP. The communications device receives a first user interface action to select the first icon, and in response to the first user interface action, displays the textual content in a designated display area using RSVP. In an alternative to this embodiment, an application interface is configurable so that any selectable item within the application interface that is associated with textual content may have that content displayed using RSVP when the item is selected.

In yet another embodiment, a search query is received by at least one server computer. At least one search result corresponding to the search query is transmitted to a browser application for display in the browser application on a user device. The search result is configured to be displayed by the browser application with an icon representing presence of content, corresponding to the at least one search result, that is displayable using RSVP.

In yet another embodiment, textual information to be displayed as part of an online advertisement is received by at least one server computer. The textual information is configured to be displayable using RSVP. The configured text is transmitted to a user device in response to a request for an online advertisement.

In yet another embodiment, RSVP content may be embedded in a map, photo, diagram, presentation, etc. A map, photo, diagram, or presentation may be displayed by the appropriate application. A user may specify whether to add "global" RSVP content and/or "local" RSVP content. If the user chooses to add "global" (e.g., in reference to a document in its entirety) RSVP content, an interface which allows the user to add the "global" RSVP content may be displayed. If the user chooses to add "local" RSVP content, an interface which allows the user to specify location(s), element(s), and/or text selection, and add the corresponding "local" RSVP content may be displayed. For example, the user may specify locations on photos, maps, etc., specify elements or objects in photos, diagrams and presentations, etc. In one embodiment, the interface may also allow selection of text such that RSVP content may be associated with the selected text. In the case of a photo, in addition to specifying locations on the photo, the user may select areas of the photo, such as, for example a face of a person.

In yet another embodiment, RSVP content may be embedded in a spreadsheet in accordance with one embodiment of the present invention. RSVP content may be embedded as a comment on any cell in a spreadsheet. To embed RSVP content, a cell may be selected. Once selected, an interface which allows the user to input textual content may be displayed. In addition, the user may specify a sequence number for the comment. The user input text may be subsequently displayable using RSVP. In one embodiment, the content of every cell and/or every comment corresponding to a cell may be displayable using RSVP. Optionally, a notification marker/icon may be displayed indicating the presence of content or a comment including RSVP content. In another embodiment, a similar process may be used to embed RSVP content in a word processing application. For example, text may be selected, and a corresponding comment may be input by a user. The comment may then be embedded in the word processing document, and may subsequently be displayed in a DRDA using RSVP upon user selection of the comment.

These and other embodiments are more fully described below.

BRIEF DESCRIPTION OF THE DRAWINGS

FIGS. 7e-7h illustrate screenshot diagrams of an exemplary homescreen including a designated RSVP display area displaying the additional levels of RSVP content indicated in FIG. 7d in accordance with one embodiment of the present invention.

FIGS. 11a-11b illustrate screenshot diagrams of an exemplary news website homepage enabled for dense content in accordance with one embodiment of the present invention.

FIG. 19 illustrates a screenshot diagram of an exemplary spreadsheet application interface including a designated RSVP display area in accordance with one embodiment of the present invention.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, the present disclosure is not intended to be limited to the embodiments shown, but is to be accorded the widest scope consistent with the principles and features disclosed herein.

Figure 1:
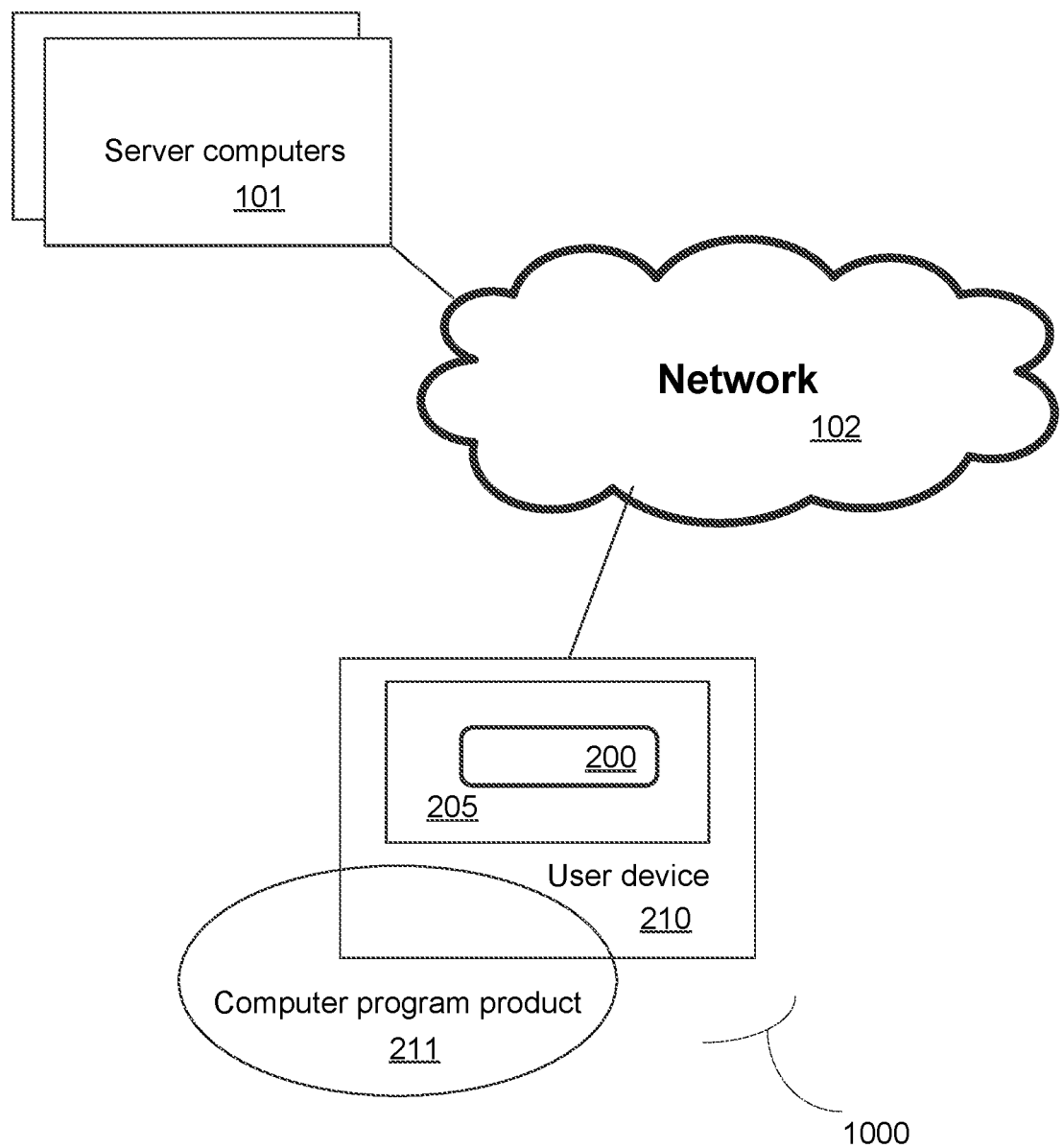
FIG. 1 is a diagram of a computer system 1000 in the context of a computer network in accordance with one embodiment of the present invention.

Referring now to FIG. 1, there is shown a diagram of an illustrative computer system 1000 in accordance with an exemplary embodiment. In this embodiment, the text display system is implemented on an end user device 210, which is configured by computer program product 211 in accordance with an exemplary embodiment. Computer program product 211 may be provided in a transitory or non-transitory computer readable medium; however, in a particular embodiment, it is provided in a non-transitory computer readable medium (e.g., persistent (i.e., non-volatile) storage, volatile memory (e.g., random access memory), or various other well-known non-transitory computer readable mediums).

End user device 210 includes a display 205. In some embodiments, display 205 may be configured to accept touch input. Computer program product 211 configures device 210 to serially present text in a designated Rapid Serial Visual Presentation ("RSVP") display area 200 on display 205 (for convenience, referenced herein simply as "DRDA 200"). User device 210 may include any type of electronic device capable of controlling text display. Some examples include desktop computers and portable electronic devices such as mobile phones, smartphones, multi-media players, e-readers, tablet/touchpad, notebook, or laptop PCs, and other communication devices. In some implementations (e.g., a smart phone or e-reader), the display 205 may be packaged together with the rest of device 210. However, in other implementations, a separate display device (e.g., a monitor) maybe be attached to device 210. While the illustrated embodiment shows a graphical border around DRDA 200, DRDA 200 simply refers to a region (e.g., a window) on display 205 where text is serially presented in accordance with an embodiment of the present invention and in particular implementations, DRDA 200 may or may not be outlined by a graphical border.

In one embodiment, user device 210 has typical computer components including a processor, memory and an input/output subsystem. In some implementations (e.g., a smart phone or e-reader), user device 210 may include a wireless transceiver, and one or more input interfaces including a touch enabled display, a trackball, keyboard, microphone, etc. In the illustrated embodiment, computer program product 211 is loaded into memory (not separately shown) to configure device 210 in accordance with the present invention. In one embodiment, text data may be loaded into memory for text processing and display processing by device 210 as will be further described herein. Text data loaded into memory for text processing and display processing may be retrieved from persistent storage on a user device such as device 210 and/or may be received from one or more server computers 101 through a connection to Network 102 (e.g., the Internet). One or more server computers 101 may be for example, one or more advertiser computers, one or more search engine computers, one or more web servers, one or more application servers, etc. In an alternative embodiment, at least some processing/pre-processing of text data for display in accordance with the principles illustrated herein may be carried out by one or more remote computers such as server computers 101 and then sent to end user device 210 for display in DRDA 200 on display 205. In such an alternative, some or all of a computer program product such as computer program product 211 for implementing an embodiment of the present invention may reside on one or more computers such as server computers 101 that are remote from end user device 210. In some embodiments, the entire computer program product may be stored and executed on remote computers and the results presented within a browser application component (e.g. a media player application) of user device 210 (browser application and media player application not separately shown).

In an embodiment of the invention, text (which includes, for example, strings of characters—e.g., letters, numbers, symbols, etc.—which constitute words, numeric figures, and combinations of both with punctuation marks and symbols) is presented serially (for example, one word at a time) within DRDA 200. As referenced herein, a "display element" will refer to a group of text data that is displayed at one time within DRDA 200. In other words, display elements are displayed serially. In the primary embodiment discussed herein, a display element will generally consist of one word. However, in alternative embodiments, two words may be presented as a single display element. Also, in the primary embodiment, two words are sometimes part of a single display element such as, for example, when a number e.g., "9," is displayed together with a unit, e.g. "feet," so that, for example, the text "9 feet" may constitute a single display element and be presented together.

In a conventional RSVP system, each word is centered in the display area, and the optimal fixation position shifts as words of differing lengths are sequentially displayed, resulting in saccade movements as the eyes shift to the optimal fixation position. The reader has to refocus on the display every time a new word appears that is of a different length than the previous word. The reader's eyes will move from one character to the next to find the optimal position, which is also referred to as a recovery saccade. In addition, when a longer word follows a shorter one, the saccadic movement direction will be from right to left. When reading text in lines in a traditional paragraph display, most saccadic movement is from left to right so the reader is accustomed to this type of eye movement. Only occasionally, if the optimal fixation position is not found directly, the reader may have to move back from right to left. Thus conventional RSVP forces the reader to experience saccades which are not normal. Conventional RSVP approaches offer no solution to these problems. In order to prevent or minimize recovery saccades in an RSVP, it is preferable to display each word such that the optimal fixation position does not shift in the display. The focal point of the reader can then remain fixed on the optimal fixation position, which is a specific point in each word that is determined by the total number of characters or width of the word. This optimal recognition position, hereinafter referred to as the "ORP," can be identified in the display such that the reader's eyes are directed to focus there as the words are serially presented. An RSVP which incorporates an ORP is hereinafter referred to as "ORP-RSVP." With an ORP-RSVP, text can then be presented at a faster rate because no saccades occur during the presentation. In addition, the elimination of saccades reduces eye fatigue and makes it more comfortable, resulting in a better reading experience for the user. Embodiments described herein may be implemented using conventional RSVP or ORP-RSVP.

In addition, words are rarely greater than 13 characters (according to Sigurd, only 0.4% of the words in the English language are longer than 13 characters—see Sigurd, B. et al, "Word Length, Sentence Length and Frequency—ZIPF Revisited", Studia Linguistica 58 (1), pp 37-52, Blackwell Publishing Ltd, Oxford UK, 2004) and therefore, for the vast majority of words, it is preferable to limit the number of characters to the right side of the fixation point to 8 characters. Also, in some embodiments, a word having a length of greater than thirteen characters is divided into first and second display elements such that a first portion of the word is displayed first (along with a hyphen) and then the second portion of the word is displayed next. In some embodiments, an empirically determined ORP of each display element is presented at a fixed location of the DRDA 200. For example, each word of a plurality of words is serially presented and positioned in the display such that the ORP is displayed at a fixed display location within DRDA 200 and this enables recognition of each word in succession with minimal saccade by the reader. Determining and displaying the ORP for display elements, and presenting display elements within DRDA 200 is described in more detail in co-pending U.S. application Ser. No. 13/547,982, now U.S. Pat. No. 8,903,174, which is hereby incorporated by reference in its entirety. Research has demonstrated that it is possible to get information about a word from up to 4 characters from the left side of the fixation position and up to 15 characters to the right side, resulting in a perceptual span of 20 characters, and that the maximum character length of a word without saccade movement is 20 characters. The DRDA 200 can accommodate text of up to 20 characters in length without saccades, although it is preferred to limit the display to 13 characters for improved comprehension.

One embodiment of the present invention provides a method for serially displaying text on an electronic display comprising identifying an ORP for a plurality of words to be displayed and serially displaying the plurality of words such that the ORP of each word is displayed at a fixed display location on the electronic display. In one embodiment, the ORP is identified as a character in the word. In another embodiment, the ORP is identified as a proportionate position relative to the width of the word in pixels. In some embodiments, visual aids are used to mark the fixed display location (see e.g., hash marks 504 in FIGS. 5*a*-5*d*) and/or an ORP within the word (e.g., different colored font).

In one embodiment, configuring text content for RSVP display comprises parsing text into a plurality of display elements, inserting blank elements at the end of a sentence, and determining a multiplier for each display element that can be used, along with user selected settings and/or other display parameters, to determine a display time for each display element. While, in alternative embodiments, it is possible to display each element for the same amount of time, it has been demonstrated empirically that a longer display time is beneficial for comprehension of longer words. It has also been demonstrated empirically that a longer pause between sentences is beneficial for comprehension of longer sentences. Further details of certain exemplary systems and methods for preparing and displaying text using RSVP are described in co-pending U.S. application Ser. No. 13/547,982 referenced above.

Figure 2:
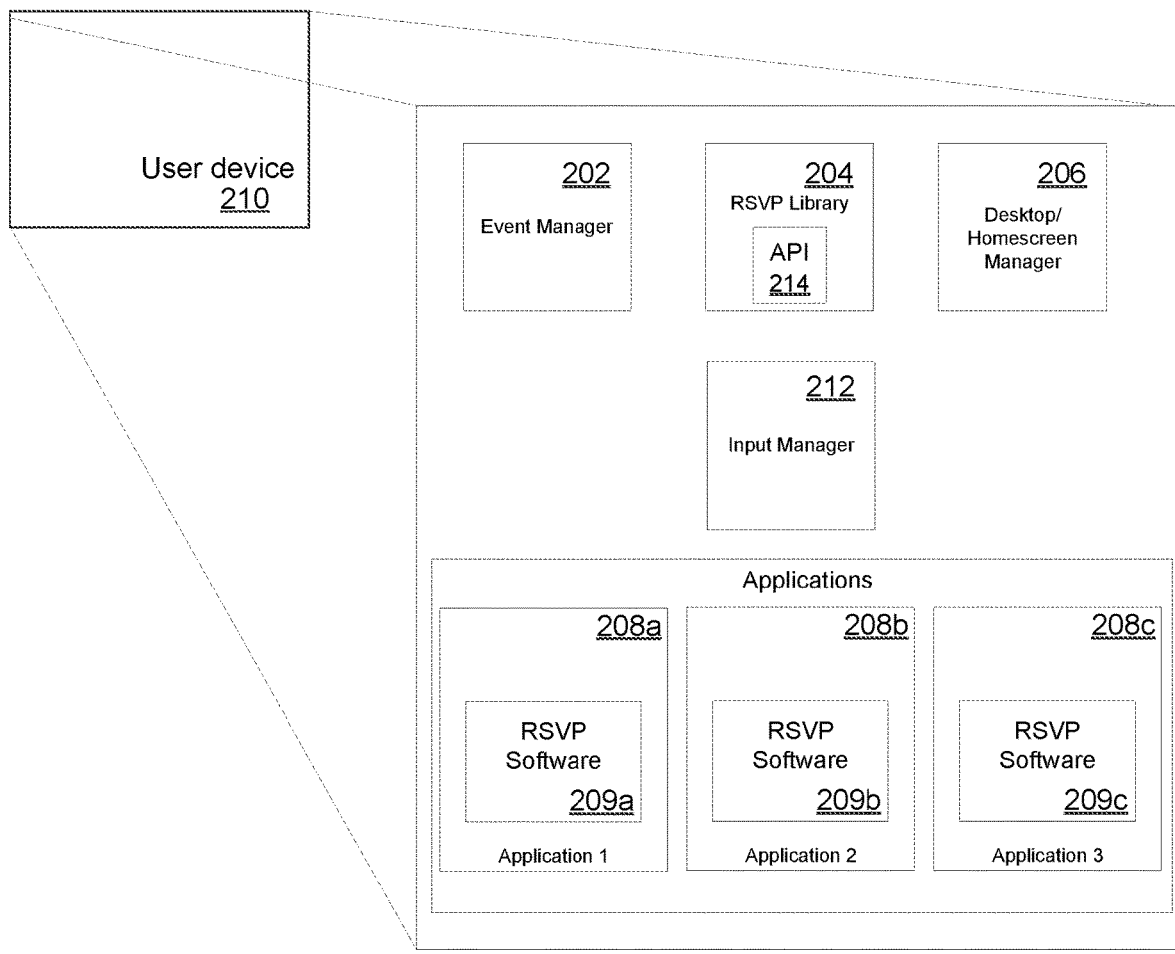
FIG. 2 is a block diagram of exemplary software modules included in the computer program product loaded on the user device of FIG. 1 in accordance with one embodiment of the present invention.

FIG. 2 is a block diagram of exemplary software modules included in the computer program product loaded on user device 210 of FIG. 1 in accordance with one embodiment of the present invention. A number of modules are shown schematically inside device 210 to indicate modules in the device associated with text display functionality in accordance with an exemplary embodiment. One or more of the modules may be implemented as part of a programmable microprocessor on the device 210, though the particular modules are shown separately in this example for clarity of explanation. Other arrangements of modules are also contemplated.

User device 210 includes a desktop/homescreen manager 206 to control various elements to be displayed on a homescreen (e.g., a "homescreen" of a smartphone running a mobile operating system such as iOS™, Android™, or Windows Phone™ or a "desktop" display of a PC, laptop, etc., running an operating system such as Windows™, or Mac™ OS; or a homescreen/desktop screen of an intermediate portable device such as notepad, touchpad, etc. running a corresponding operating system; all referenced herein as simply a "homescreen" for simplicity). For example, desktop/homescreen manager 206 may control the icons, widgets, tiles, windows, folders, etc. and other information that may be displayed on a desktop or homescreen. An input manager 212 manages inputs received from one or more input mechanisms such as a touch-screen, trackball, keyboard, mouse, microphone, eye-tracking, a gesture detector, or other natural interface input detector, etc. For example, text input may be provided using a virtual (i.e., touch screen) or physical keyboard, mouse, trackball, etc. Alternatively, or in addition, a user may provide voice/speech input via a microphone, which may then be converted to text. Various applications 208 (including, for example, applications 208*a*, 208*b*, and 208*c*) may run on the device and may provide data to be displayed through desktop/homescreen manager 206.

Various messages (e.g., email, SMS) may be received over a network such as a wireless communications network connected to the Internet, via a wireless interface (not shown). Information received from the network, such as from one or more remote servers, may be provided to the applications 208 by event manager 202, and information may be passed from the applications 208 back to the network. Event manager 202 may manage notification events that are presented to a user, e.g., through display 205. For example, event manager 202 may receive notification events from the wireless network. Notification events may include, for example receipt of text messages, emails, voicemails, social network updates, file transfers, etc. The event manager 202 may in turn forward the notification events to corresponding applications. For example, an email notification may be forwarded to the email application. The application may then instruct the desktop or homescreen manager 206 to display status or notification information to alert the user.

As will be described in further detail below, RSVP library 204 allows user device 210 to present display elements using RSVP. In accordance with an exemplary embodiment, applications 208*a*, 208*b*, and 208*c*, which may be a word processing application, a spreadsheet application, a photo application, a map application, a webpage editor, a browser application, etc., may communicate with RSVP library 204 through a RSVP application programming interface (API), such as API 214. As will be apparent to one of skill in the art, an API is an interface used by software components to communicate with each other. In one embodiment, each application 208*a*, 208*b*, and 208*c* may include application specific RSVP software, such as RSVP software 209*a*, 209*b*, and 209*c*, respectively, which may allow applications 208*a*, 208*b*, and 208*c* to detect presence of RSVP content. Upon detecting RSVP content, RSVP software, such as RSVP software 209*a*, 209*b*, and/or 209*c* may call RSVP library 204 via the API. In response, RSVP library 204 may display RSVP notification markers/icons, display DRDA 200, display RSVP content in DRDA 200, etc. In an alternate embodiment, the application specific RSVP software, such as RSVP software 209a, 209b, and/or 209c may instead be included in RSVP library 204. In one embodiment, application specific RSVP software, such as RSVP software 209a, 209b, and 209c may additionally include logic to allow embedding of textual content within a file. Embedding textual content in a file is described in more detail in the description of FIGS. 17, 18a and 18b.

Figure 3:
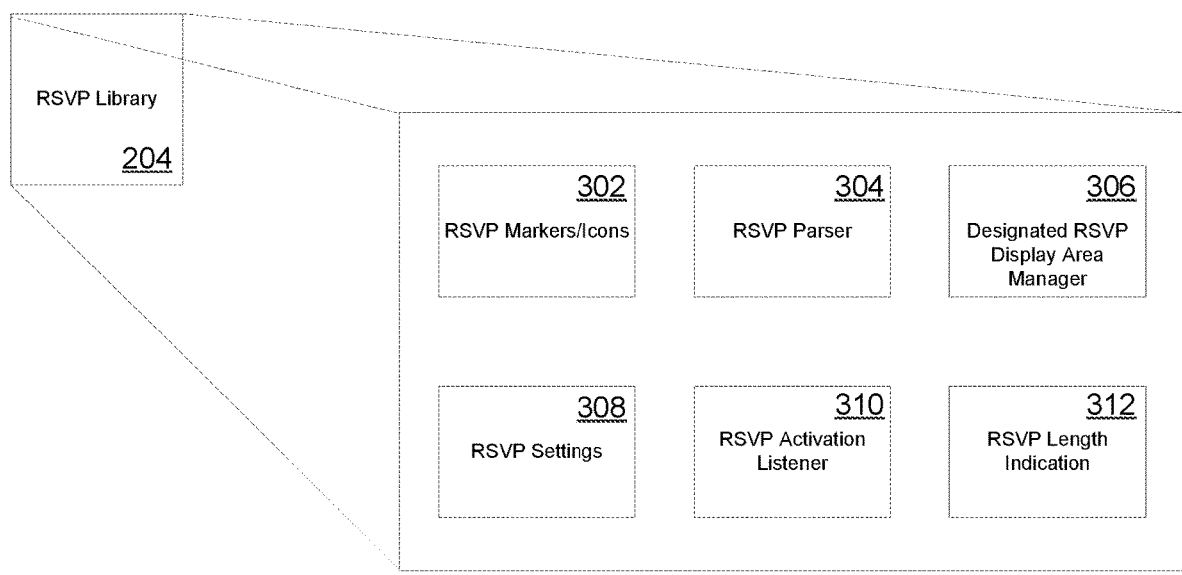
FIG. 3 is a block diagram of exemplary software modules included in the RSVP library of FIG. 2 in accordance with one embodiment of the present invention.

FIG. 3 is a schematic diagram of various software modules that may be included in RSVP library 204 in accordance with an exemplary embodiment. Though the particular modules are shown separately in this example for clarity of explanation, one or more modules may be combined. Other arrangements of modules are also contemplated. RSVP library 204 includes RSVP notification markers or icons 302, RSVP parser 304, designated RSVP display area manager 306, RSVP settings 308, RSVP activation listener 310, and RSVP length indication 312. RSVP notification markers or icons 302 are displayed by RSVP library 204 to alert a user of the presence of RSVP content. RSVP parser 304 may parse textual data into individual display elements suitable for display in DRDA 200. Designated RSVP display area manager 306 may display DRDA 200 when appropriate user input is received. RSVP settings 308 include settings related to displaying display elements using RSVP such as, the speed of display, selection of the type of user input to activate RSVP display, etc. RSVP activation listener 310 detects appropriate user input which is intended to select a RSVP notification marker/icon. RSVP length indication 312 determines the length of the RSVP content, which may be displayed, for example adjacent to DRDA 200. In one embodiment, the length may be displayed as an amount of time (e.g., in seconds). Alternatively, or in addition, the length may be displayed graphically as, for example a status bar. As will be apparent to one of skill in the art, that the length may be displayed various other ways.

Figure 4B:
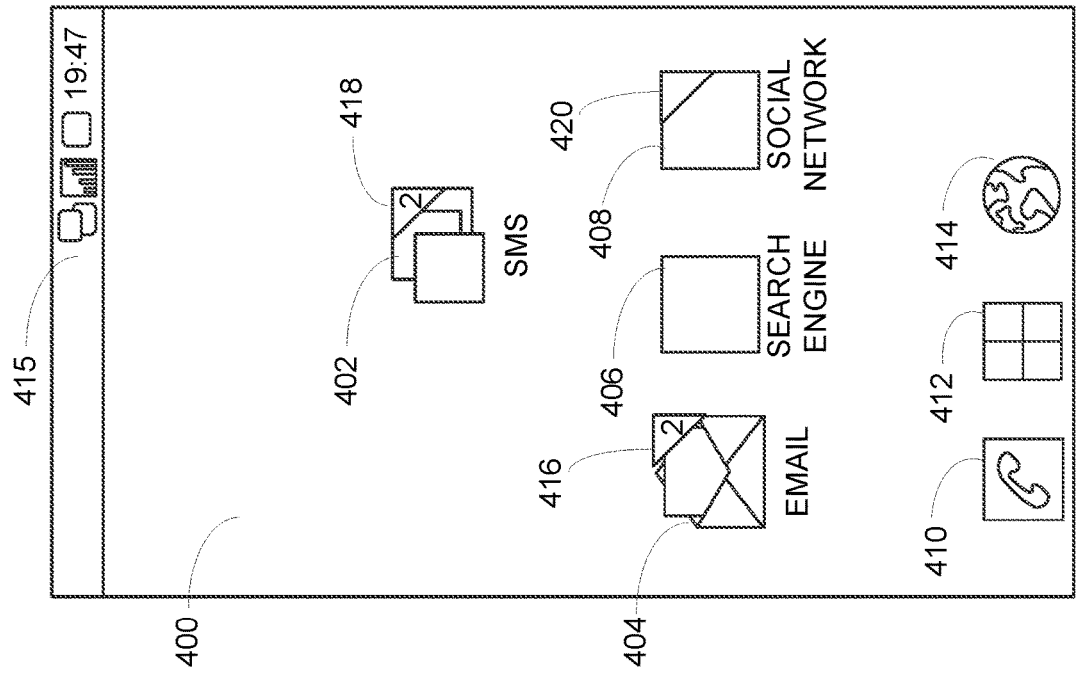
FIGS. 4a-4b illustrate screenshot diagrams of an exemplary homescreen in accordance with one embodiment of the present invention.
Figure 4A:
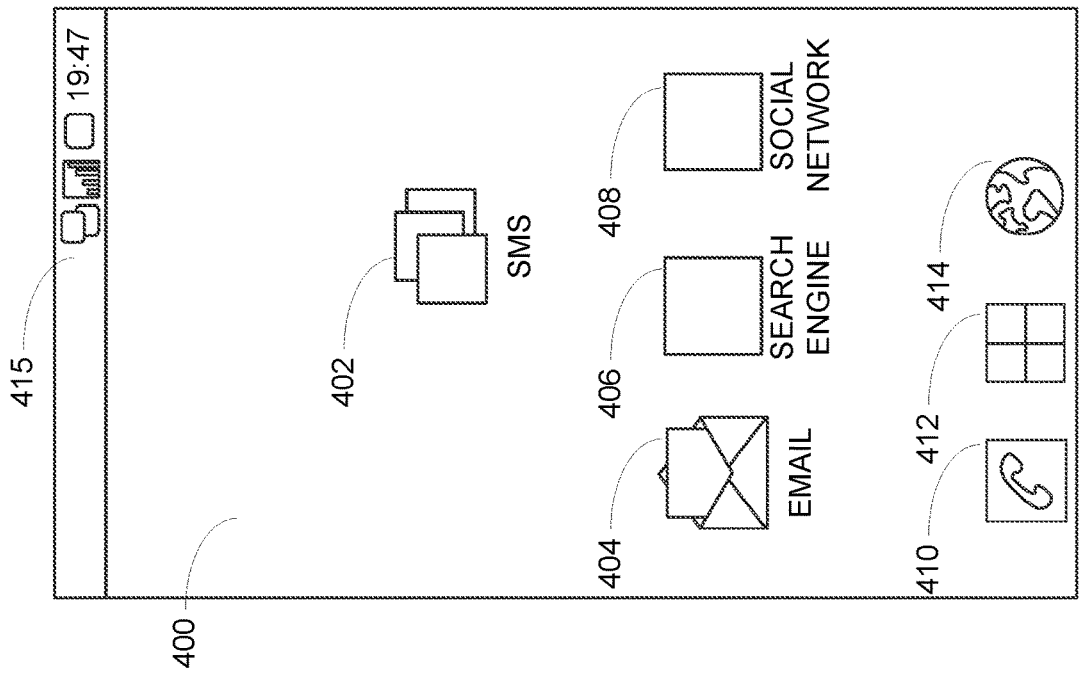

FIG. 4a is an illustrative homescreen 400 of a mobile communications device which has enabled display of textual information using RSVP in accordance with an exemplary embodiment. Homescreen 400 includes icons 402, 404, 406, 408, 410, 412, and 414 corresponding to various different applications. Homescreen 400 also includes status area 415 which may show notification events or indicators such as battery, signal strength, etc. FIG. 4b is an illustrative homescreen 400 which displays RSVP notification markers/icons 416, 418 and 420. RSVP notification markers/icons 416, 418 and 420 indicate presence of RSVP content, i.e., content that is configured to be displayed using RSVP. As shown, notification markers/icons 416, 418 and 420 are overlaid on top of icons 404, 402 and 408, respectively. In some embodiments, RSVP notification markers/icons may include a numerical indicator as shown in RSVP notification markers/icons 416 and 418. The numerical indicators may indicate the quantity of notifications associated with that application. For example, RSVP notification marker/icon 416 indicates that there are two new email messages. As will be apparent to one of skill in the art, the numerical indicators may be incremented as additional notification events are received and decremented as notification events are viewed. In some embodiments, notification markers/icons may also be color coded. For example, a notification marker/icon may be a certain color when new notification events are present, and a different color when all notification events have been viewed. Alternatively, notification markers/icons may be removed once notification events have been viewed. Although notification markers/icons 416, 418 and 420 are shown overlaid on top of icons 404, 402 and 408, in some embodiments, notification markers/icons may be displayed adjacent to, above, or below icons 404, 402 and 408. In other embodiments, notification markers/icons 416, 418 and 420 may be displayed in other areas of homescreen 400. For example, notification markers/icons may be displayed in status area 415. In other implementations, such as on desktop or laptop PCs, notification markers/icons may be displayed in the taskbar area typically located in the bottom right corner. In some embodiments, application specific notification markers/icons, DRDA, etc. may be implemented. For example, a social networking application may employ customized RSVP notification markers/icons and/or DRDA such that the RSVP notification markers/icons and/or DRDA are consistent with the application UI.

In yet another embodiment, for certain applications, notification markers/icons may not be displayed. For example, for SMS and/or email applications, where notification events typically include textual content, RSVP display may be enabled by default such that content associated with all notification events for these applications may be displayed using RSVP upon user selection of a notification event or upon user interaction with a selectable item (e.g., an email or a text message).

FIGS. 5a-5d illustrate screenshot diagrams of an exemplary homescreen including a designated RSVP display area, which displays textual content associated with a notification event using RSVP in accordance with one embodiment of the present invention. As shown in FIGS. 5a-5d, upon user selection of a notification marker/icon, textual content associated with the corresponding notification event is displayed using RSVP in DRDA 502. The user may select a notification marker/icon a number of different ways. For example, in a smartphone with a touch enabled display implementation, the user may touch and hold the notification marker/icon. Alternatively, the user may tap the notification marker/icon, swipe across the notification marker/icon, etc. In one embodiment, user selection of notification markers/icons may be determined by eye-tracking, gesture detection, or other natural interface input detection. As will be apparent to one of ordinary skill in the art, various different user input methods may be used to select the notification marker/icon. In other implementations, such as on a desktop or laptop PC, or on devices without a touch enabled display, user selection of notification markers/icons may be provided using, for example a keyboard, mouse, trackball, eye-tracking, etc. It should be noted that user selection of notification markers/icons does not necessarily require clicking or tapping a particular notification marker/icons. User selection may be made simply by "rolling" or "hovering" over a notification marker/icon. In one embodiment, the desired method may be selected in RSVP settings 308 (see FIG. 3).

Figure 5A:
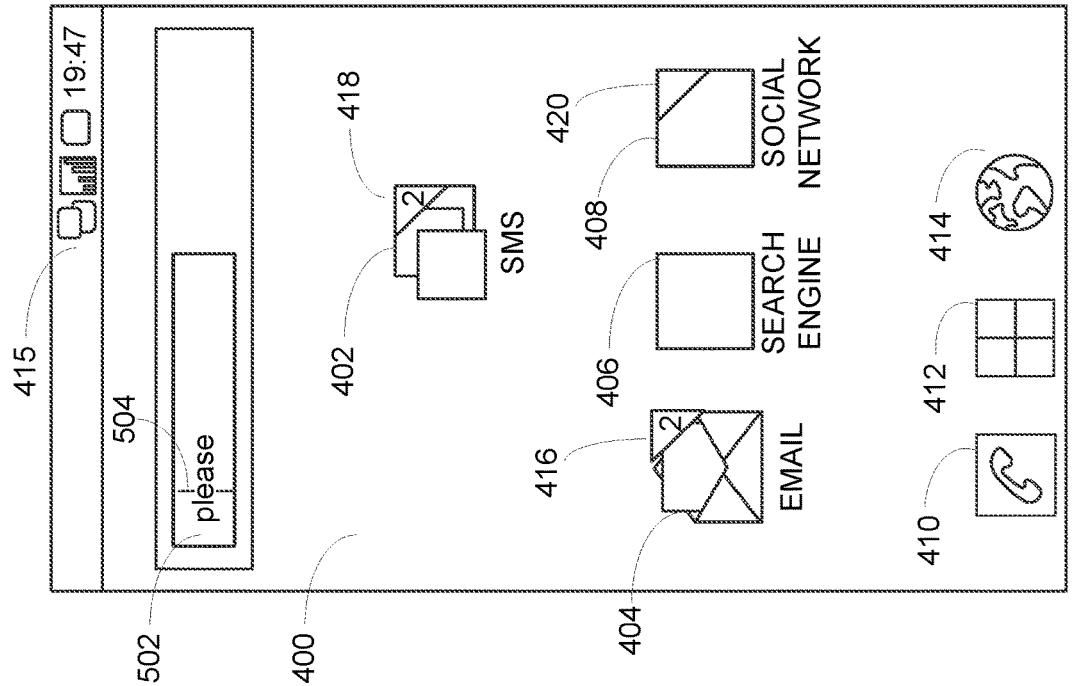
FIGS. 5a-5d illustrate screenshot diagrams of an exemplary homescreen including a designated RSVP display area, which displays textual content associated with a notification event using RSVP in accordance with one embodiment of the present invention.
Figure 5B:
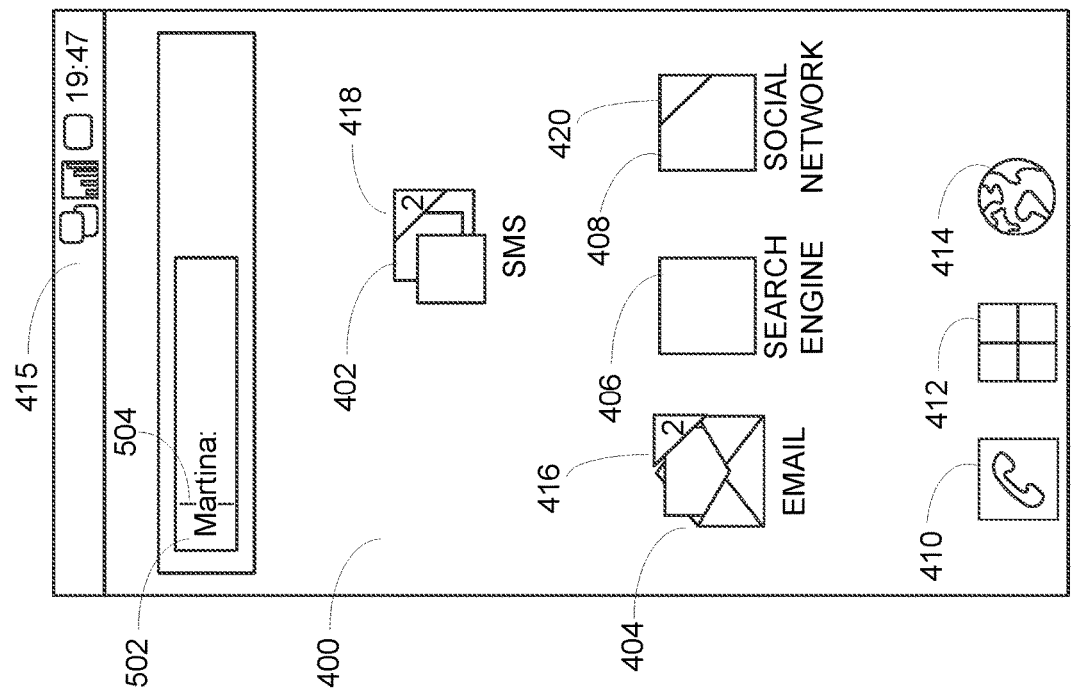
Figure 5C:
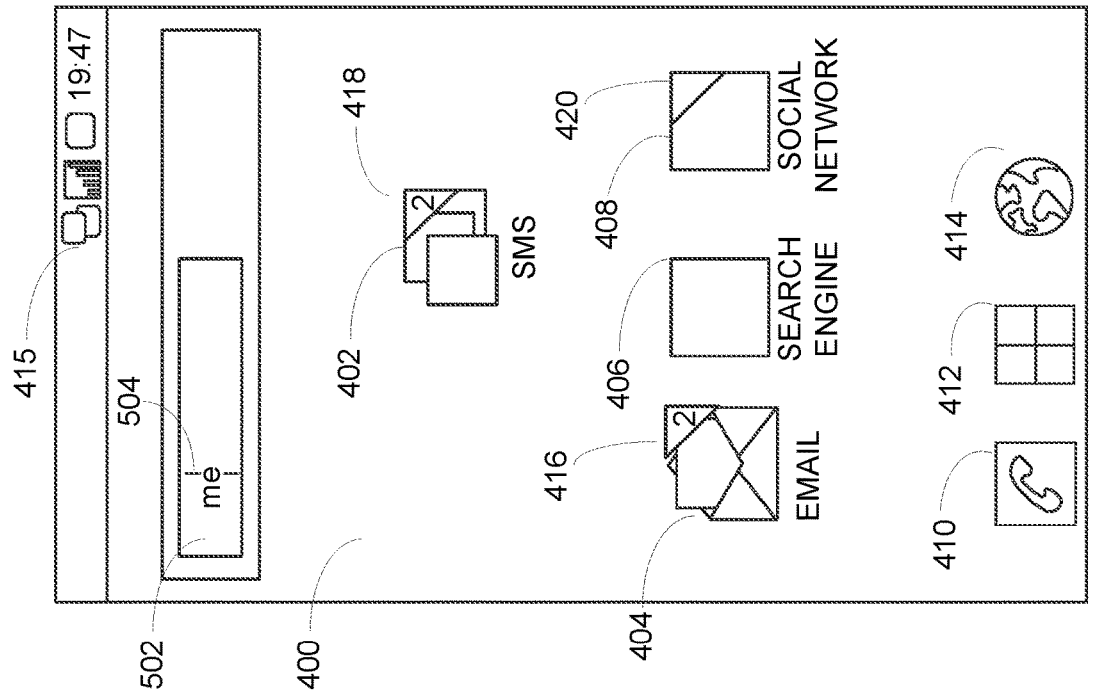
Figure 5D:
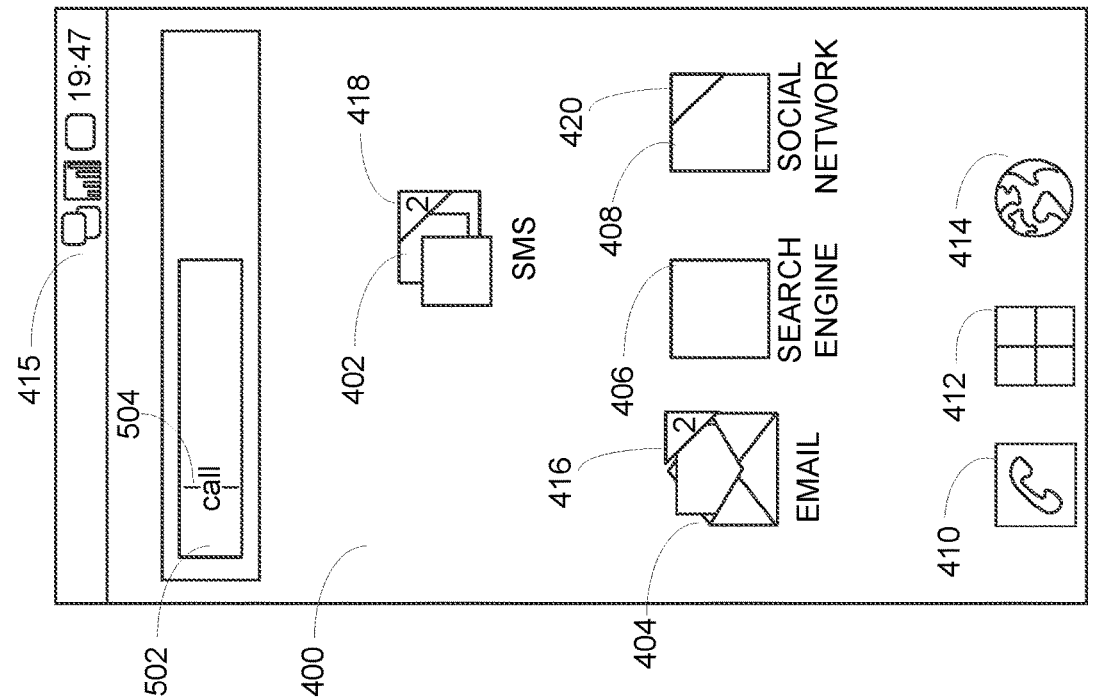

In the example illustrated in FIGS. 5a-5d, if the user selects notification marker/icon 418, DRDA 502 may be displayed on homescreen 400, and DRDA 502 may display, using RSVP, the first of two SMS messages, which reads "Martina: please call me." It should be noted that FIGS. 5a-5d illustrate time sequence snapshots of the content displayed in DRDA 502. For example, FIG. 5a shows that DRDA 502 displays "Martina:" at time 1, FIG. 5b shows that DRDA 502 displays "please" at time 2, FIG. 5c shows that DRDA 502 displays "call" at time 3, and FIG. 5d shows that DRDA 502 displays "me" at time 4. DRDA 502 may display an ORP of each word at a fixed display location between hash marks 504. As previously discussed, an empirically determined ORP of each display element may be presented at a fixed location of DRDA 502, the fixed display location being between hash marks 504. It should be noted that hash marks 504 are not shown in subsequent figures to avoid overcomplicating the figures, and embodiments of the invention may be implemented using either ORP-RSVP or conventional RSVP. In addition, although DRDA 502 is shown displayed on top of the display, DRDA 502 may be positioned in any portion of the display. Although the embodiment illustrated in FIGS. 5a-5d shows display of textual content associated with a notification event using RSVP on a homescreen, in some embodiments, content may be displayed using RSVP on a screen other than the homescreen, such as, for example, a "lock screen." As will be apparent to one of skill in the art, notification events are often displayed on a "lock screen." In such an instance, selecting the notification(s) on the lock screen may result in content associated with the notification event being displayed in a DRDA using RSVP on the "lock screen."

Figure 6B:
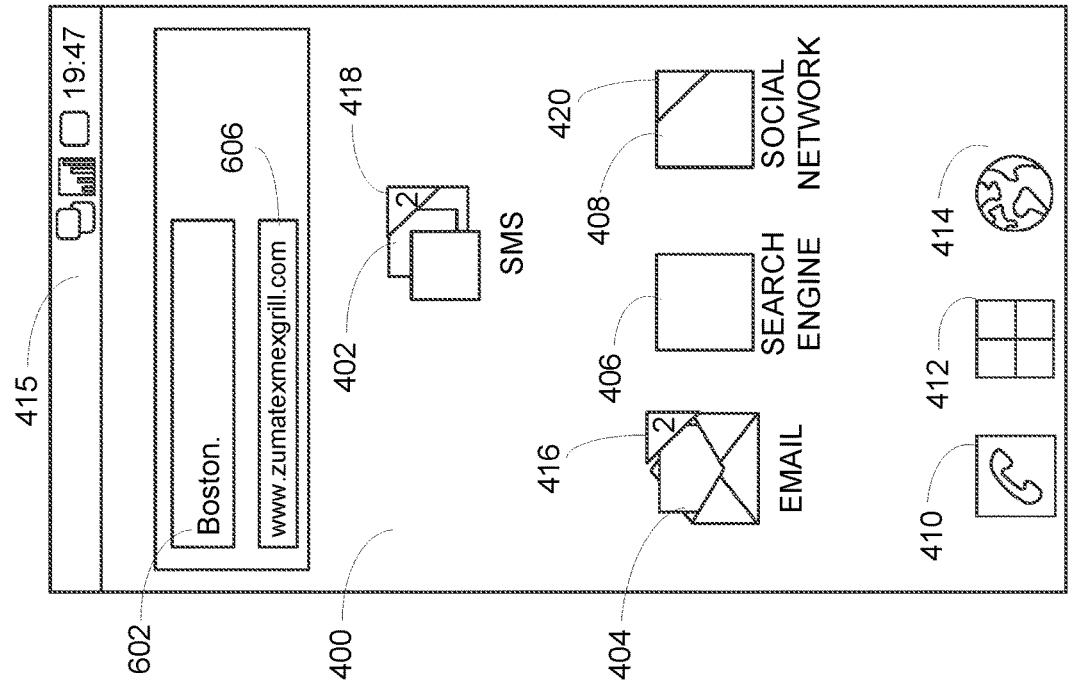
FIGS. 6a and 6b illustrate screenshot diagrams of an exemplary homescreen including a designated RSVP display area, along with a notification indicating the presence of an attachment or URL in accordance with one embodiment of the present invention.
Figure 6A:
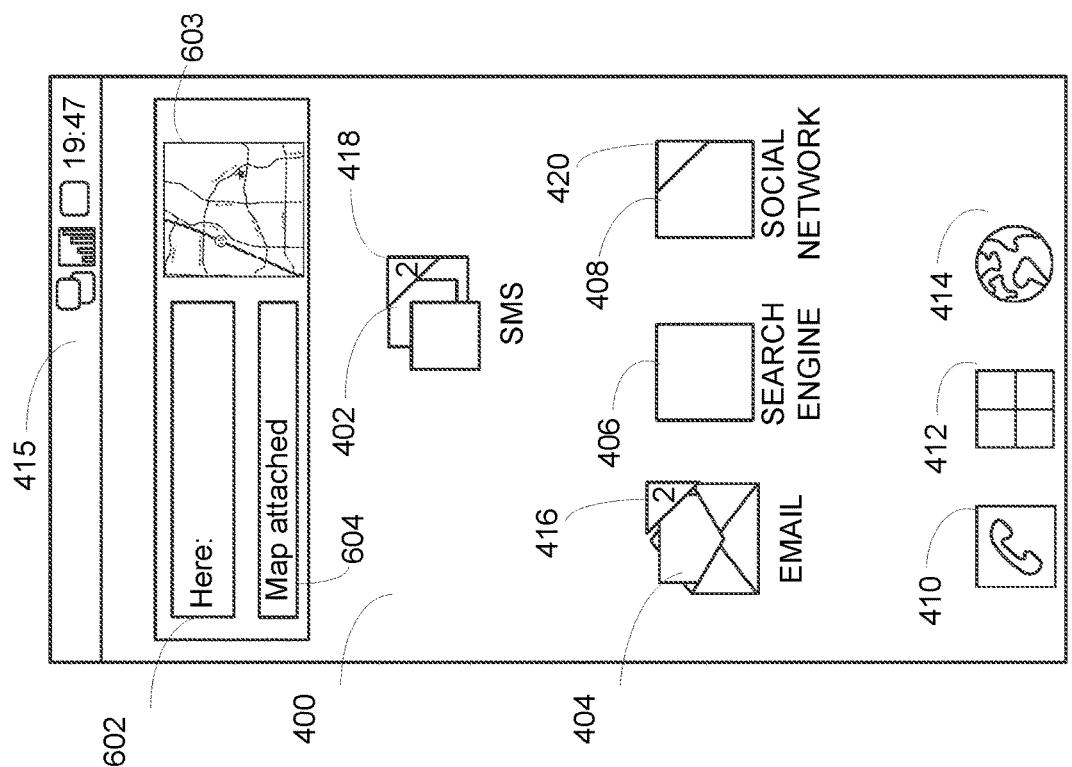

FIGS. 6a and 6b illustrate screenshot diagrams of an exemplary homescreen including a designated RSVP display area, along with a notification indicating the presence of an attachment or URL in accordance with one embodiment of the present invention. As shown, the RSVP content may include one or more file attachments and/or URLs. If there is an attachment and/or URL included in the RSVP content, a notification indicating the presence of an attachment and/or URL may be displayed with the DRDA. In one embodiment, a thumbnail image corresponding to the attachment or URL may be displayed in addition to, or instead of, the notification. FIG. 6a illustrates DRDA 602 with a notification 604 indicating the presence of a map attachment. Also shown is thumbnail 603, which corresponds to the map attachment. Although thumbnail 603 is shown displayed adjacent to DRDA 602, thumbnail 603 may be displayed anywhere on the display. Various types of attachments may be included with RSVP content. For example, in addition to maps, photos, documents (e.g., PDFs), etc. may also be attached to RSVP content. FIG. 6b illustrates an example with a notification 606 indicating that a URL is included with the RSVP content. As discussed above in the example of a map attachment, a thumbnail image (not shown in FIG. 6b) corresponding to the URL may be displayed in addition to, or instead of, notification 606. It should be noted that although notifications 604 and 606 are displayed underneath DRDA 602, notifications 604 and 606 may be displayed adjacent to, above, or below DRDA 602. Alternatively, the notifications may be displayed in any other location on the display. In some embodiments, the content of a webpage corresponding to the URL may be displayed using RSVP in DRDA 602. In other embodiments, an application corresponding to the attachment may be launched to open the attachment and/or URL. For example, a photo application may be launched to open a photo, or a web browser may be launched to open a URL included with RSVP content. The process of displaying content included in an attachment and/or content of a webpage corresponding to a URL included with RSVP content is described in more detail in the description of FIG. 12.

Figure 7B:
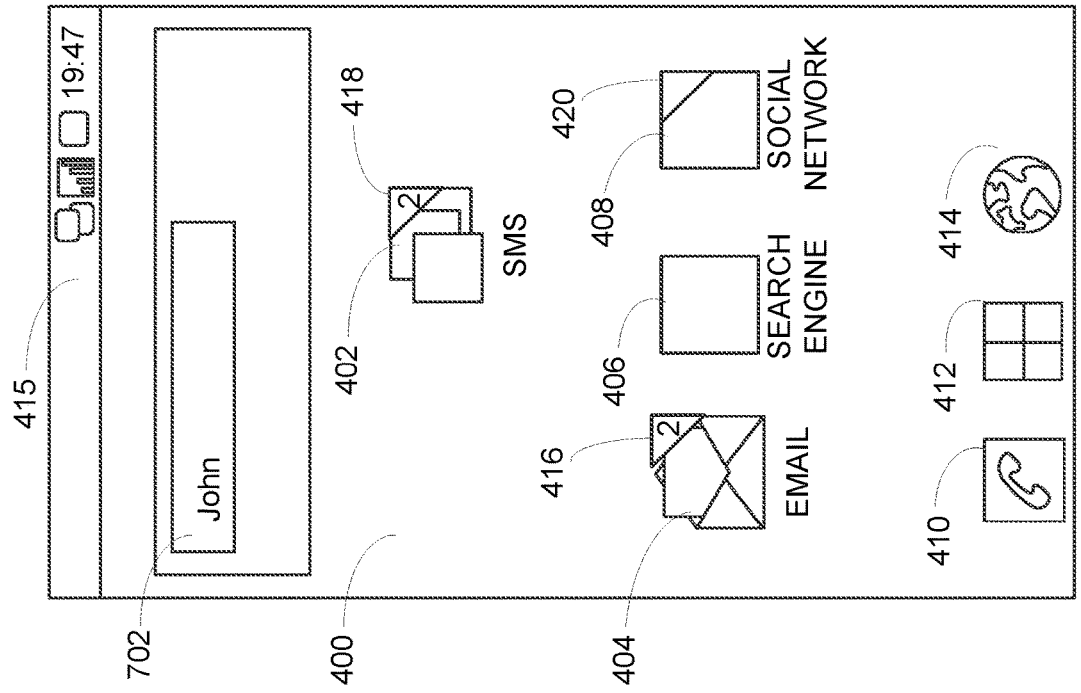
FIGS. 7a-7c illustrate screenshot diagrams of an exemplary homescreen including a designated RSVP display area in accordance with one embodiment of the present invention.
Figure 7A:
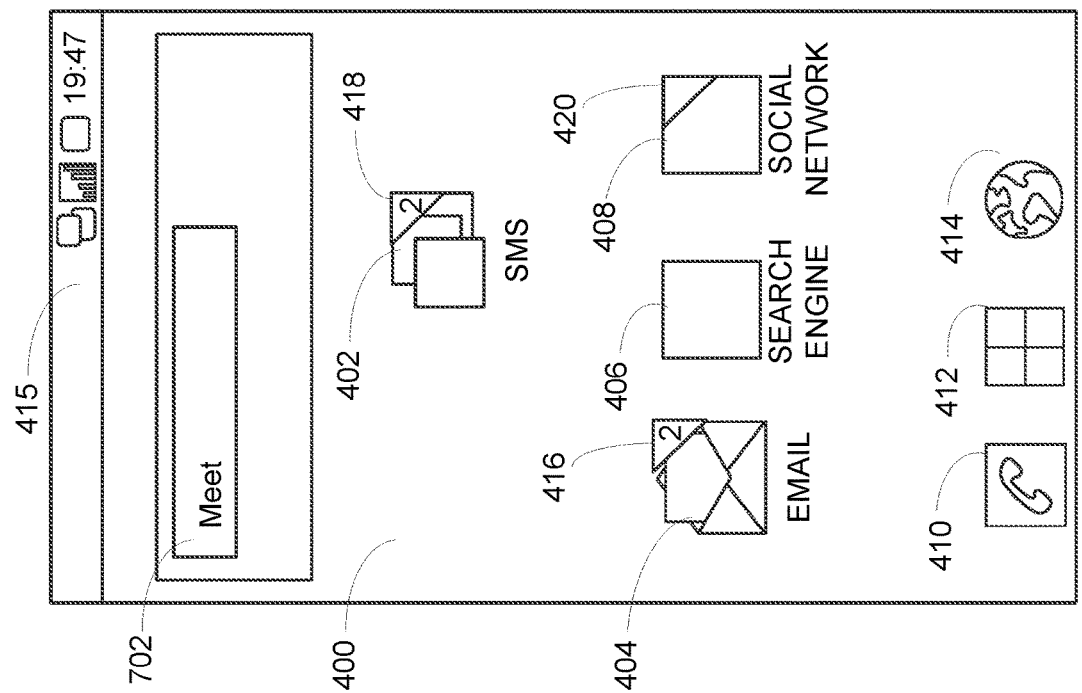
Figure 7D:
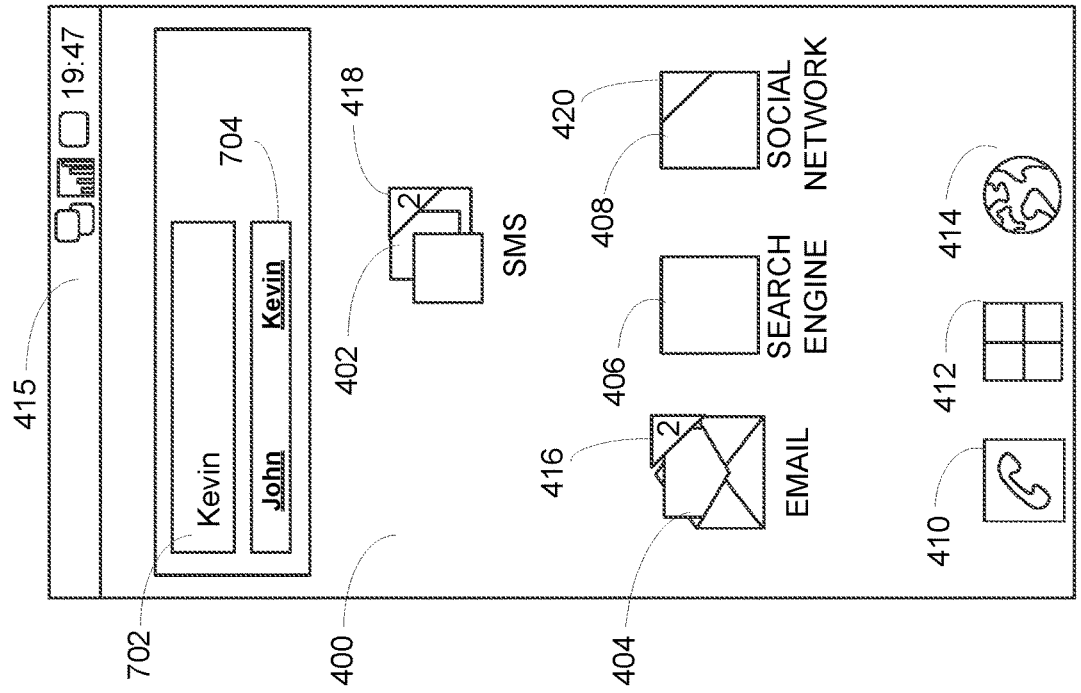
FIG. 7d illustrates a screenshot diagram of an exemplary homescreen including a designated RSVP display area, along with a notification indicating the presence of multiple levels of RSVP content in accordance with one embodiment of the present invention.
Figure 7C:
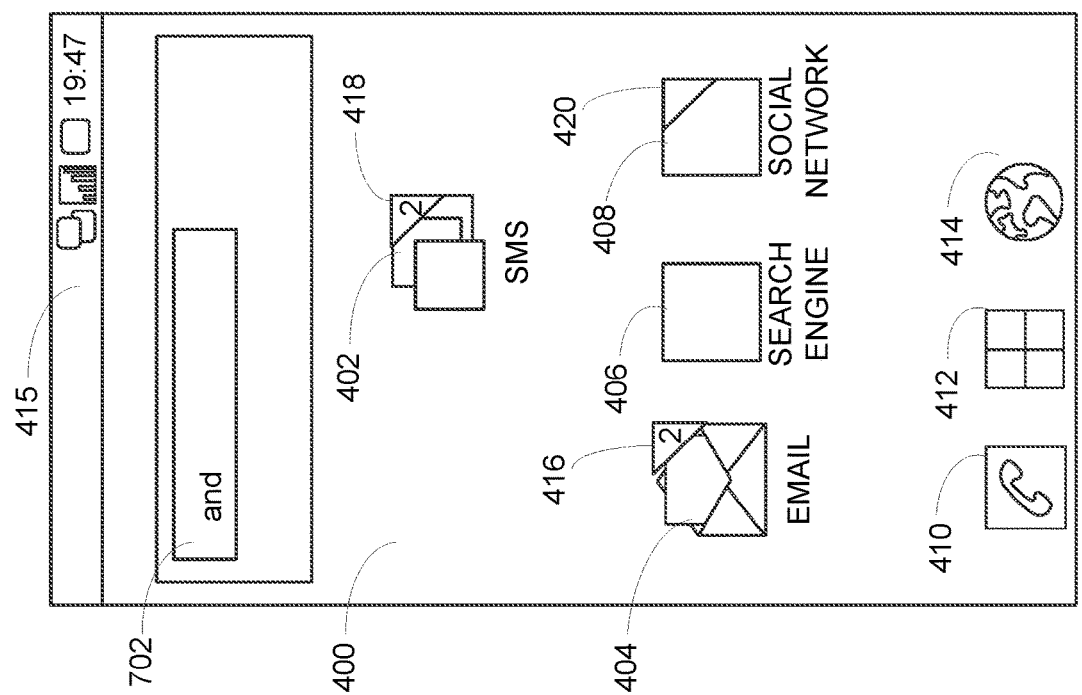
Figure 7H:
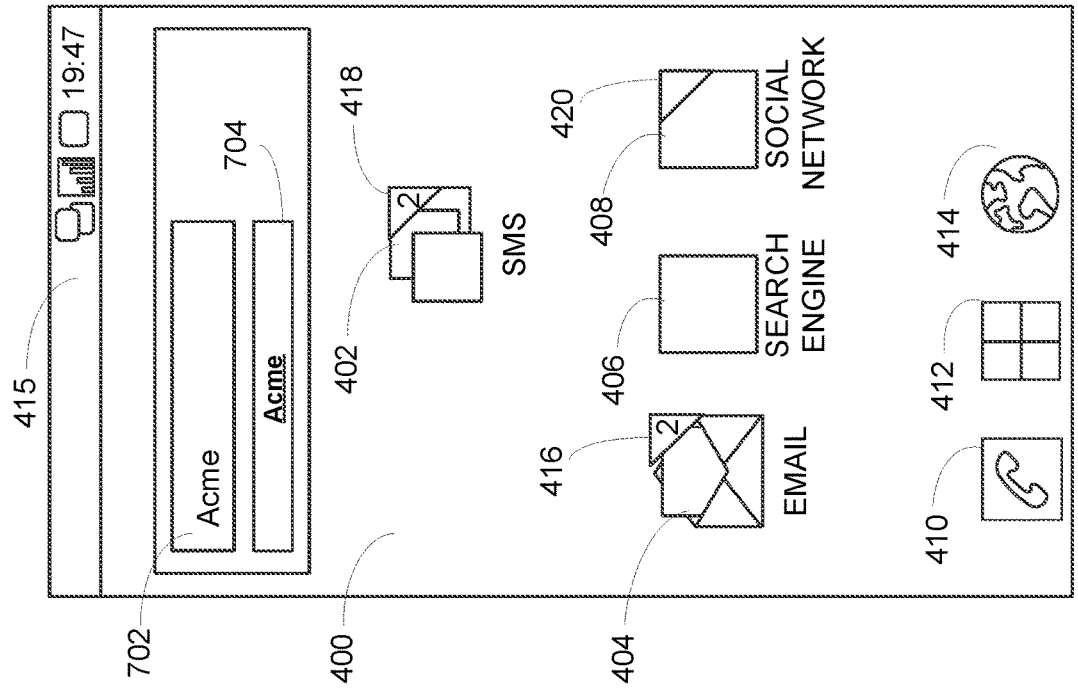
Figure 7G:
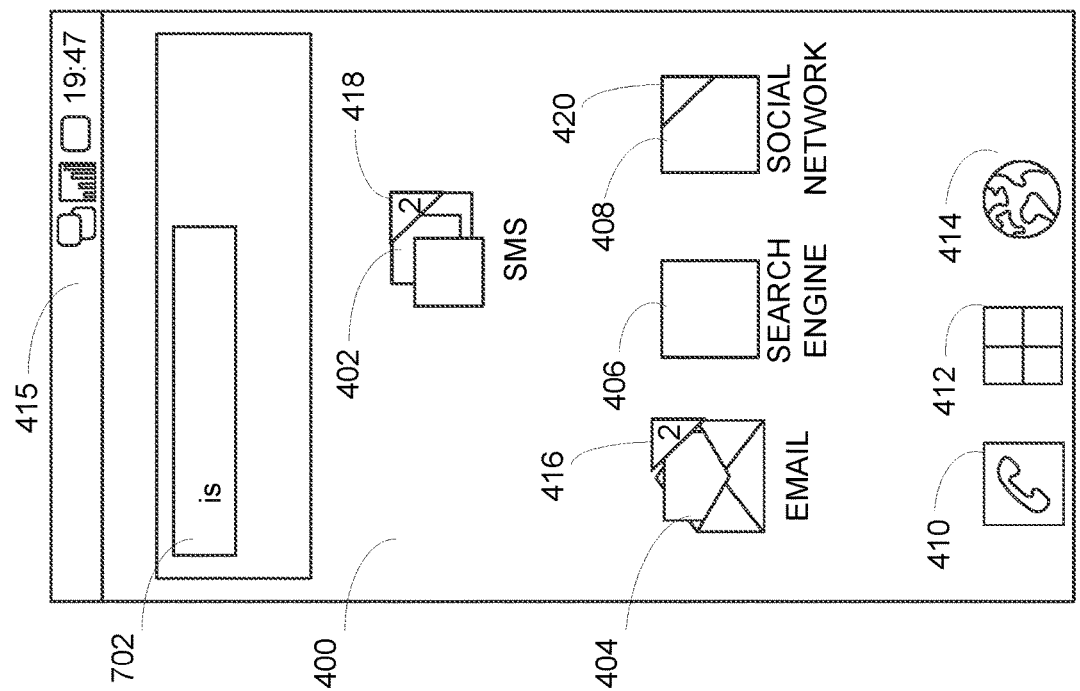

FIGS. 7a-7c illustrate screenshot diagrams of an exemplary homescreen including a designated RSVP display area, and FIG. 7d illustrates a screenshot diagram of an exemplary homescreen including a designated RSVP display area, along with a notification indicating the presence of multiple levels of RSVP content in accordance with one embodiment of the present invention. It should be noted that FIGS. 7a-7d illustrate time sequence snapshots of the content displayed in DRDA 702. For example, FIG. 7a shows that DRDA 702 displays "Meet" at time 1, FIG. 7b shows that DRDA 702 displays "John" at time 2, FIG. 7c shows that DRDA 702 displays "and" at time 3, and FIG. 7d shows that DRDA 702 displays "Kevin" at time 4. In one embodiment, RSVP content may include multiple or "cascading" levels of RSVP content. For example, RSVP content may itself include further RSVP content. The presence of additional levels of RSVP content may be indicated by, for example displaying a notification similar to the notifications used to indicate the presence of an attachment and/or URL (see FIGS. 6a and 6b). FIGS. 7a-7d illustrate DRDA 702 which displays the message "Meet John and Kevin." However, this message includes additional RSVP content as indicated by notification 704 in FIG. 7d, which displays "John" and "Kevin." "John" and "Kevin" are selectable items within notification 704 which represent further embedded RSVP content. For example, if the user selects "John", the RSVP content associated with "John" may be displayed.

FIGS. 7e-7h illustrate screenshot diagrams of an exemplary homescreen including a designated RSVP display area displaying the additional level of RSVP content associated with "John" in accordance with one embodiment of the present invention. DRDA 702 displays "John's business is Acme." As discussed above, FIGS. 7e-7h illustrate time sequence snapshots of the content displayed in DRDA 702. The message "John's business is Acme" may further include embedded RSVP content, as indicated by "Acme" in notification 704. If the user selects "Acme," the RSVP content associated with "Acme" may be displayed (not separately shown). Similarly, if the user selects "Kevin," RSVP content associated with "Kevin" may be displayed in DRDA 702 (not separately shown). It should be noted that although additional RSVP content was embedded in "John" and "Kevin," RSVP content may also be embedded in phrases, sentences, paragraphs, etc. For example, "John's business is Acme" may have been embedded in "Meet John" instead of just "John."

Figure 8A:
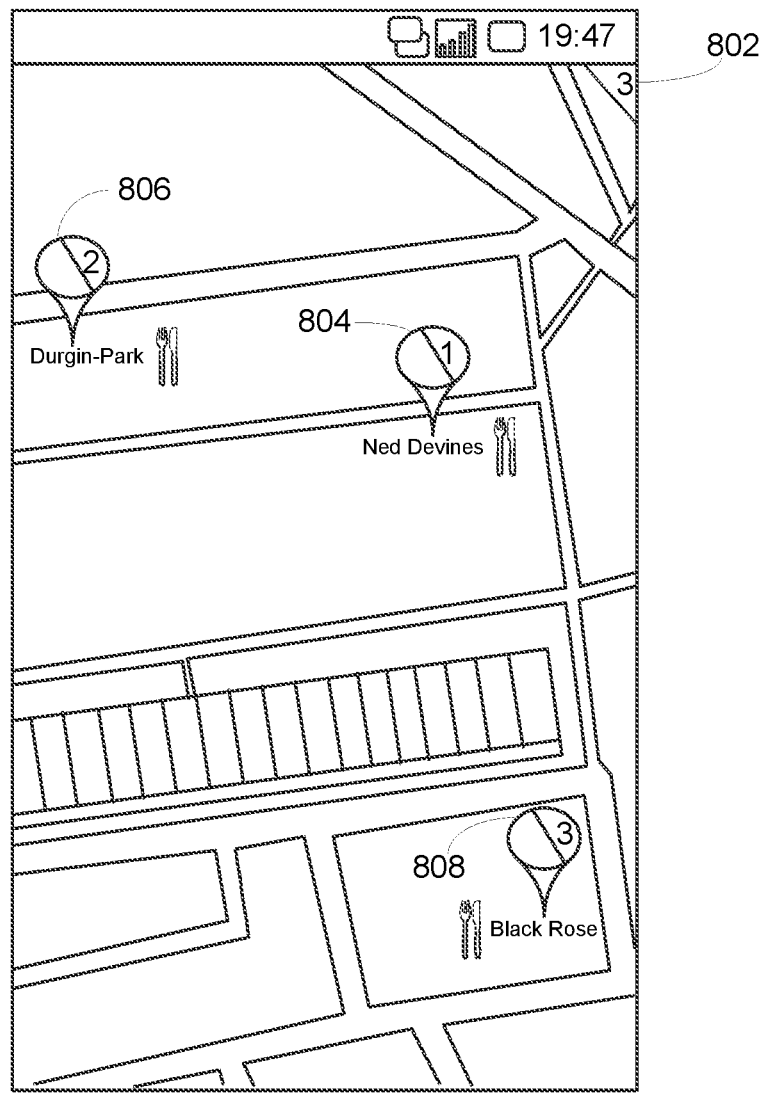
FIGS. 8a-8c illustrate screenshot diagrams of an exemplary maps application in accordance with one embodiment of the present invention.
Figure 8C:
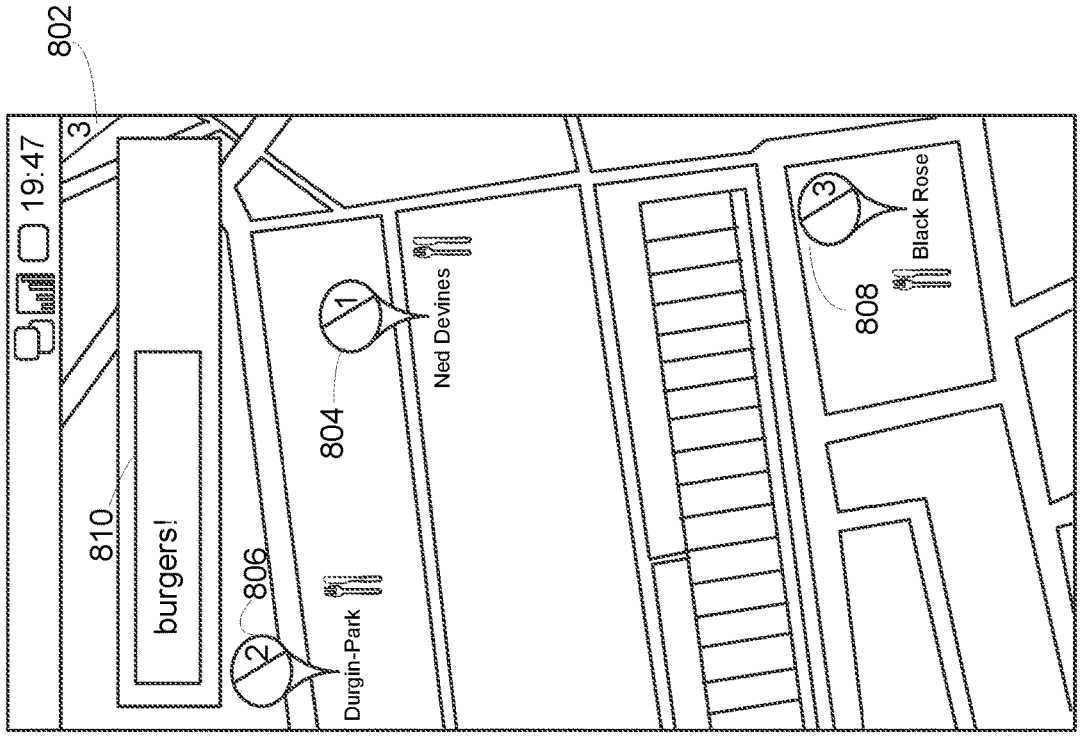
Figure 8B:
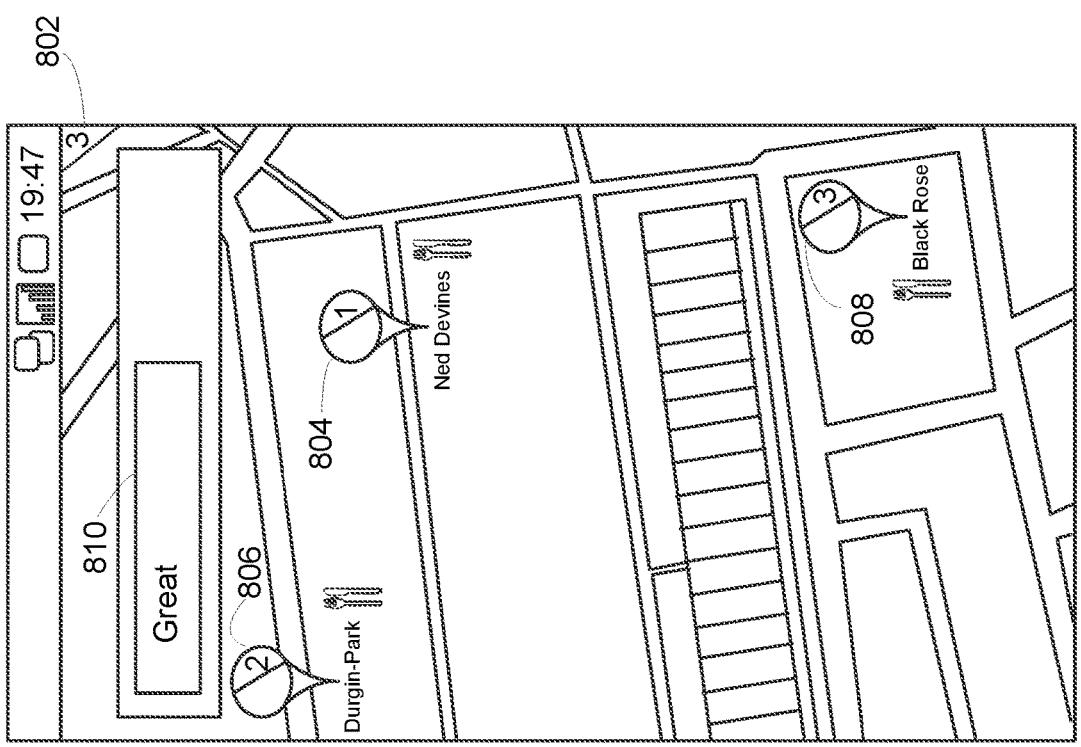

FIGS. 8a-8c illustrate a screenshot diagram of an exemplary maps application in accordance with one embodiment of the present invention. RSVP content may be implemented in virtually any application. For example, FIG. 8a shows a maps application in which the presence of RSVP content is indicated by notification markers/icons 804, 806 and 808. Notification 802 may be included to indicate the quantity of notification markers/icons displayed on the map, and to notify the user of "global" RSVP content corresponding to the whole map (as opposed to RSVP content corresponding to specific locations on the map, which are specified by markers/icons 804, 806 and 808). For example, notification 802 may have associated with it RSVP content such as "Check out these three restaurants." Thus, if notification 802 is selected by the user, DRDA 810 may display "Check out these three restaurants" (this message is not separately shown in the figures and DRDA 810 is not separately shown in FIG. 8a). It should be noted that although notification 802 is shown in the top-right corner, notification 802 may be displayed anywhere on the display. As shown, notification markers/icons 804, 806 and 808 include numerical indicators. In one embodiment, the numerical indicators may be used to denote quantity. In other embodiments, the numerical indicators may be used to indicate a preferred viewing order. For example, notification markers/icons 804, 806 and 808 may be used to indicate presence of RSVP content related to restaurants at specified locations on the map, and the numerical indicators alert the user to view the notifications in the specified order. If the user selects notification marker/icon 804, DRDA 810 may be displayed as shown in FIG. 8b. As shown in FIGS. 8b and 8c, DRDA 810 may display "Great burgers!," which is associated with notification marker/icon 804, using RSVP. It should be noted that FIGS. 8b-8c illustrate time sequence snapshots of the content displayed in DRDA 810. For example, FIG. 8b shows that DRDA 810 displays "Great" at time 1, and FIG. 8c shows that DRDA 810 displays "burgers" at time 2. In one embodiment, DRDA 810 may automatically display RSVP content associated with markers 804, 806 and 808 in sequential order after user selection of notification 802. For example, if the user selects notification 802, DRDA 810 may display "Check out these three restaurants" and then automatically display "Great burgers!", (associated with marker 804) and then automatically display RSVP content associated with markers 806 and 808.

Figure 9A:
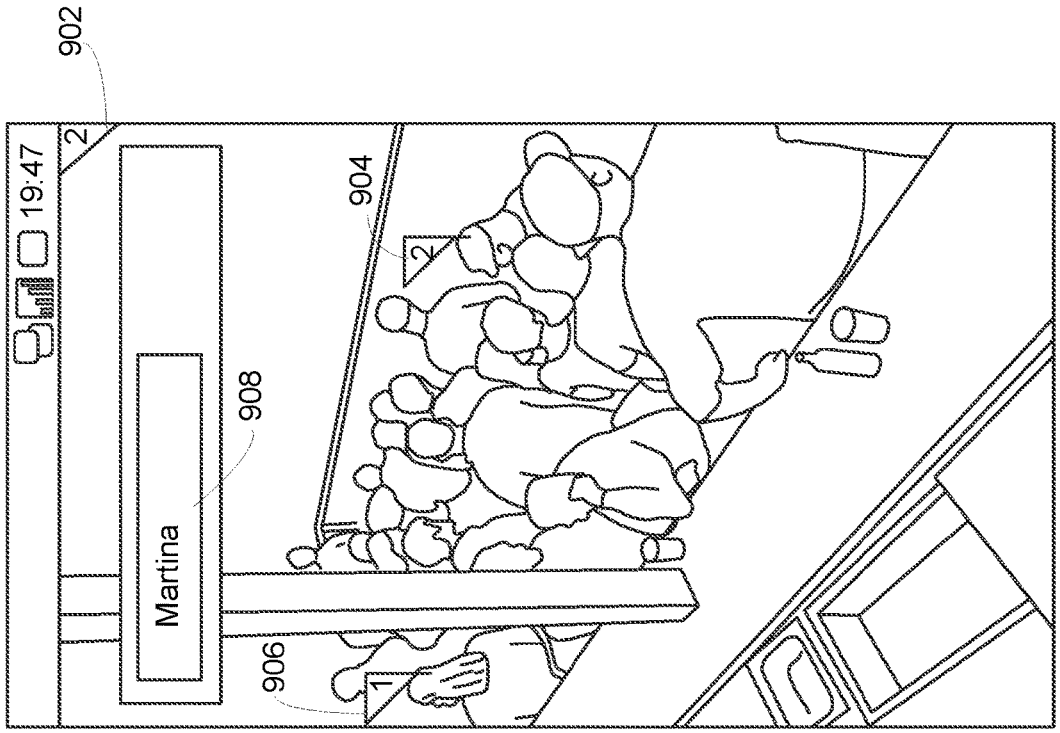
FIGS. 9a-9d illustrate screenshot diagrams of an exemplary photo application in accordance with one embodiment of the present invention.
Figure 9B:
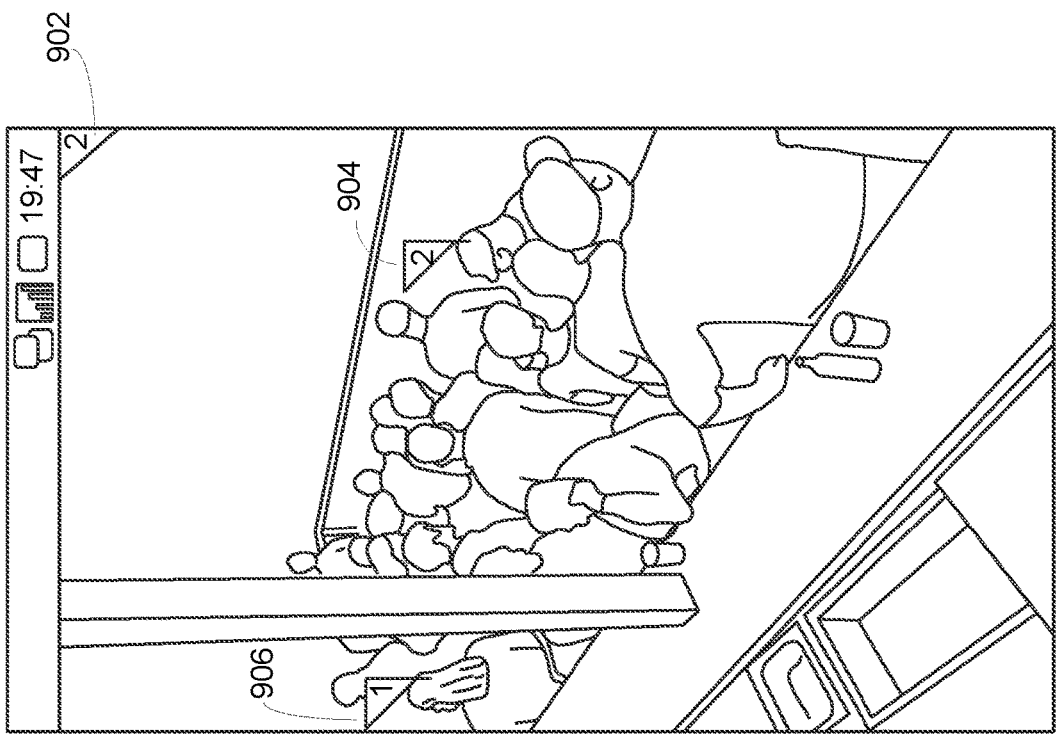
Figure 9C:
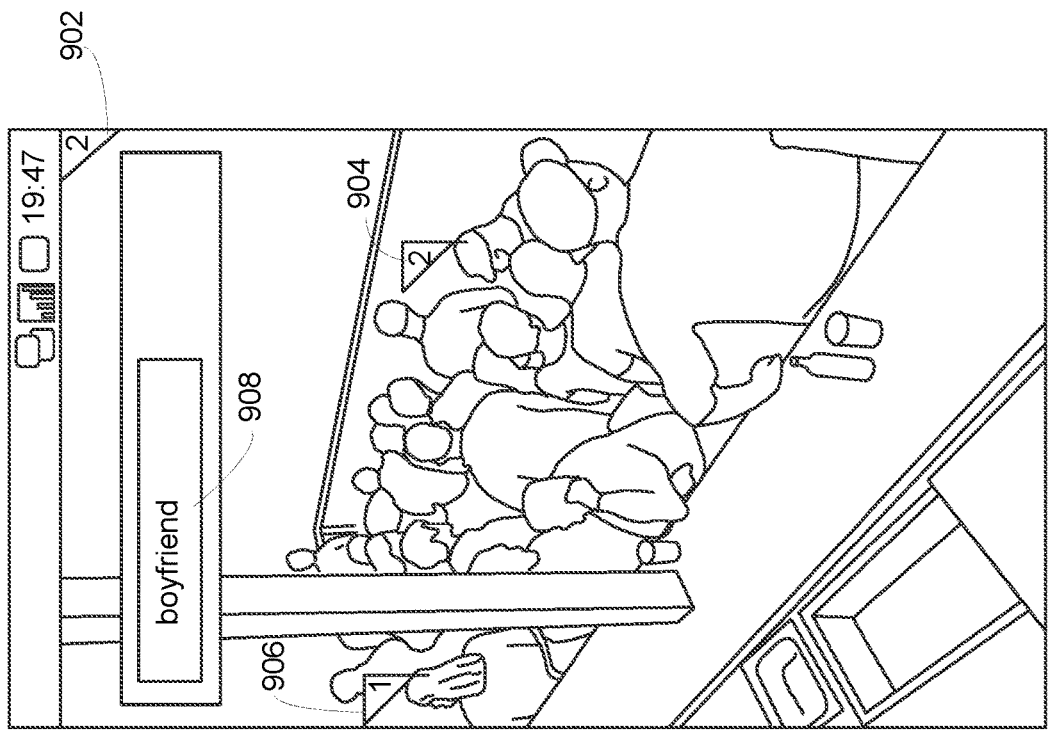
Figure 9D:
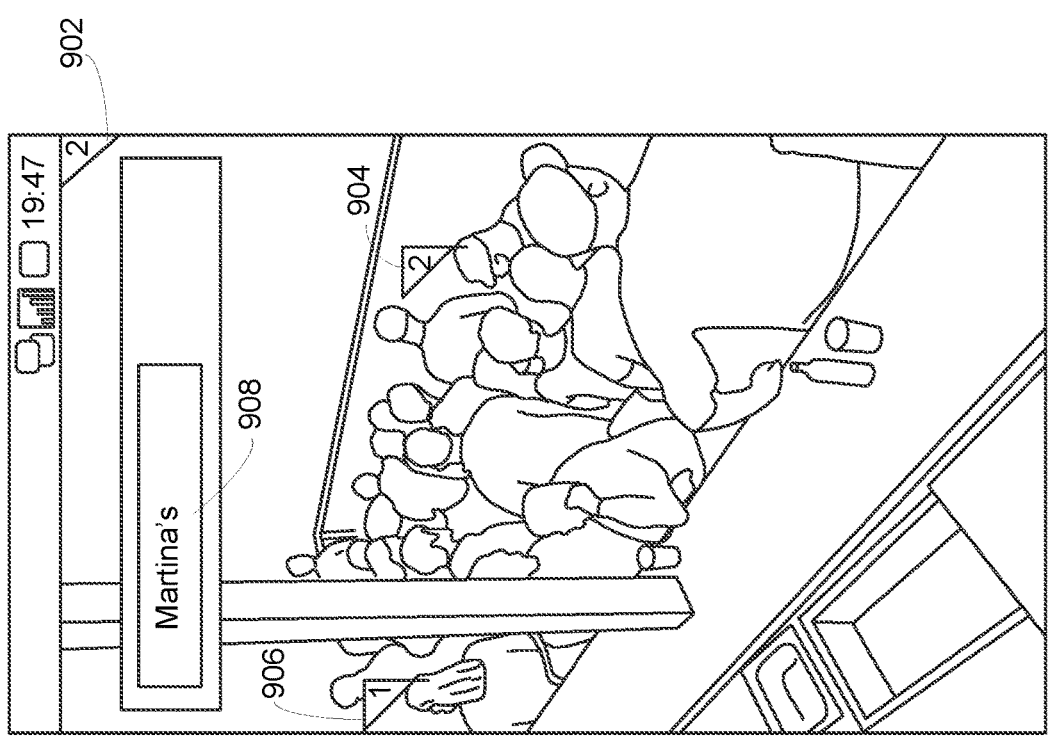

FIGS. 9a-9d illustrate screenshot diagrams of an exemplary photo application in accordance with one embodiment of the present invention. As shown in the example of FIGS. 9a-9d, RSVP content may be embedded in a photo. As shown in FIG. 9a, notification 902 may be displayed to indicate the quantity of notification markers/icons, and to notify the user of "global" RSVP content associated with the whole photo (as opposed to RSVP content associated with specific locations on the photo, which are specified by markers/icons 904, and 906). For example, notification 902 may have associated with it RSVP content such as "These are my friends." Thus, if notification 902 is selected by the user, DRDA 908 may display "These are my friends" using RSVP (this message is not separately shown in the figures and DRDA 908 is not separately shown in FIG. 9a). It should be noted that although notification 902 is shown in the top-right corner, notification 902 may be displayed anywhere on the display. Notification markers/icons 904 and 906 may be displayed to indicate presence of "local" RSVP content associated with the location on the photo specified by the notification marker/icon. For example, as shown in FIG. 9b, upon user selection of notification marker/icon 906, DRDA 908 may be displayed, and "Martina," which is associated with the location on the photo specified by notification marker/icon 906 may be displayed in DRDA 908. Similarly, as shown in FIGS. 9c and 9d, upon user selection of notification marker/icon 904, DRDA 908 may be displayed, and "Martina's boyfriend," which is associated with the location on the photo specified by notification marker/icon 904 may be displayed using RSVP in DRDA 908. It should be noted that FIGS. 9c-9d illustrate time sequence snapshots of the content displayed in DRDA 908. For example, FIG. 9c shows that DRDA 908 displays "Martina's" at time 1, and FIG. 9d shows that DRDA 908 displays "boyfriend" at time 2. The process of embedding RSVP content in photos is described in more detail in the description of FIG. 17. In one embodiment, DRDA 908 may automatically display RSVP content associated with markers 904, and 906 in sequential order after user selection of notification 902. For example, if the user selects notification 902, DRDA 908 may display "These are my friends" and then automatically display "Martina" (associated with marker 906), and then automatically display "Martina's boyfriend" (associated with marker 904). In a particular embodiment, when RSVP content is played automatically for multiple markers, each marker is visually highlighted (e.g., bolded) while the RSVP content associated with that marker is being displayed.

Figure 10A:
FIGS. 10a-10c illustrate screenshot diagrams of an exemplary search results page in accordance with one embodiment of the present invention.
Figure 10B:
Figure 10C:
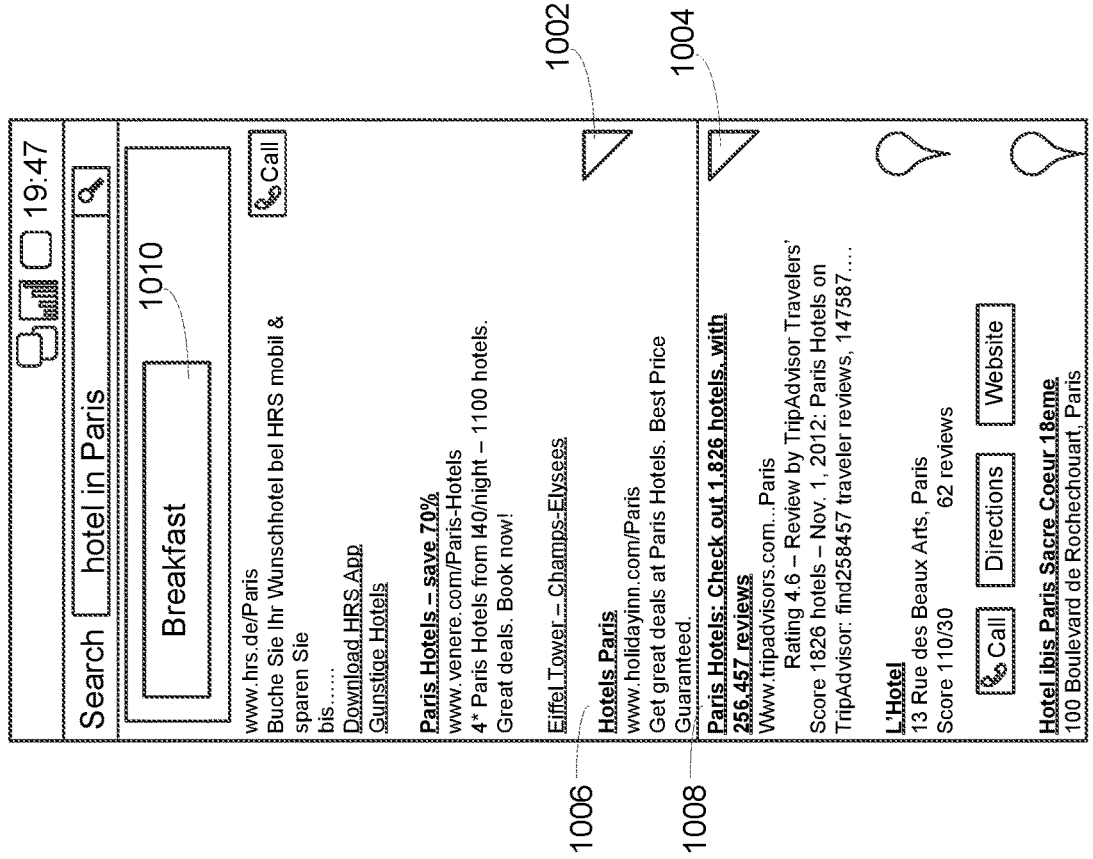

FIGS. 10a-10c illustrate screenshot diagrams of an exemplary search results page in accordance with one embodiment of the present invention. Another example in which RSVP content may be employed is in the display of search results, including sponsored search results, display advertisements, etc. FIG. 10a shows a screenshot of a search results page for a search query "hotel in paris." As shown, one or more search results corresponding to the search query may be displayed. One or more of the search results (or sponsored search results, display advertisements, etc.) may be displayed with a notification marker/icon indicating the presence of RSVP content associated with that search result (or sponsored search results, display advertisements, etc.). For example, notification markers/icons 1002 and 1004 may be displayed adjacent to search results 1006 and 1008, respectively, to indicate presence of RSVP content associated with those search results. Search result 1006 may be a sponsored search result. In some embodiments, notification markers/icons 1002 and 1004 may be displayed above, below, or in any other location on the display. In one embodiment, advertisers and/or search engine providers may choose to embed specifically chosen content as RSVP content in the search results in order to include more information than what is displayable in the provided space. In another embodiment, content from a webpage may be embedded as RSVP content. For example, in the case of sponsored search result 1006, the advertiser may provide content which the advertiser wishes to be embedded as RSVP content (e.g., "Free Breakfast" as shown in FIGS. 10b and 10c). However, in some embodiments, like in the case of search result 1008, content from the corresponding webpage (e.g., HTML text) may be embedded as RSVP content. The process of embedding RSVP content in search results (or sponsored search results, display advertisements, etc.) is described in more detail in the description of FIG. 16.

Upon user selection of notification marker/icon 1002, DRDA 1010 may be displayed as shown in FIGS. 10b and 10c, and "Free breakfast" may be displayed using RSVP in DRDA 1010. It should be noted that FIGS. 10b-10c illustrate time sequence snapshots of the content displayed in DRDA 1010. For example, FIG. 10b shows that DRDA 1010 displays "Free" at time 1, and FIG. 10c shows that DRDA 1010 displays "breakfast" at time 2.

FIGS. 11a-11b illustrate screenshot diagrams of an exemplary news website homepage configured with RSVP content in accordance with one embodiment of the present invention. In one embodiment, RSVP content may be employed on websites to advantageously increase content density. This allows websites that provide large quantities of content such as, for example, news portals and eCommerce sites, to benefit from faster selection and reading of content by the visitor, especially on communication devices which have small displays. For instance, in the example of a news website, news headlines 1102, 1104, 1106, 1108, 1110, 1112, and 1114 may be presented as shown in FIG. 11a. As shown in FIG. 11b, upon user selection of one of headlines 1102, 1104, 1106, 1108, 1110, 1112, and 1114, DRDA 1116 may be displayed, and the contents of the corresponding story may be displayed using RSVP in DRDA 1116. In one embodiment, the content of the news story may be configured using a <meta> HTML tag. For example, the story may be configured using <meta name="RSVP" content="RSVP content goes here">. Thus, when the browser application opens the page, it may search for the <meta name="RSVP"> tag, and display the text included in the content parameter using RSVP.

Figure 12:
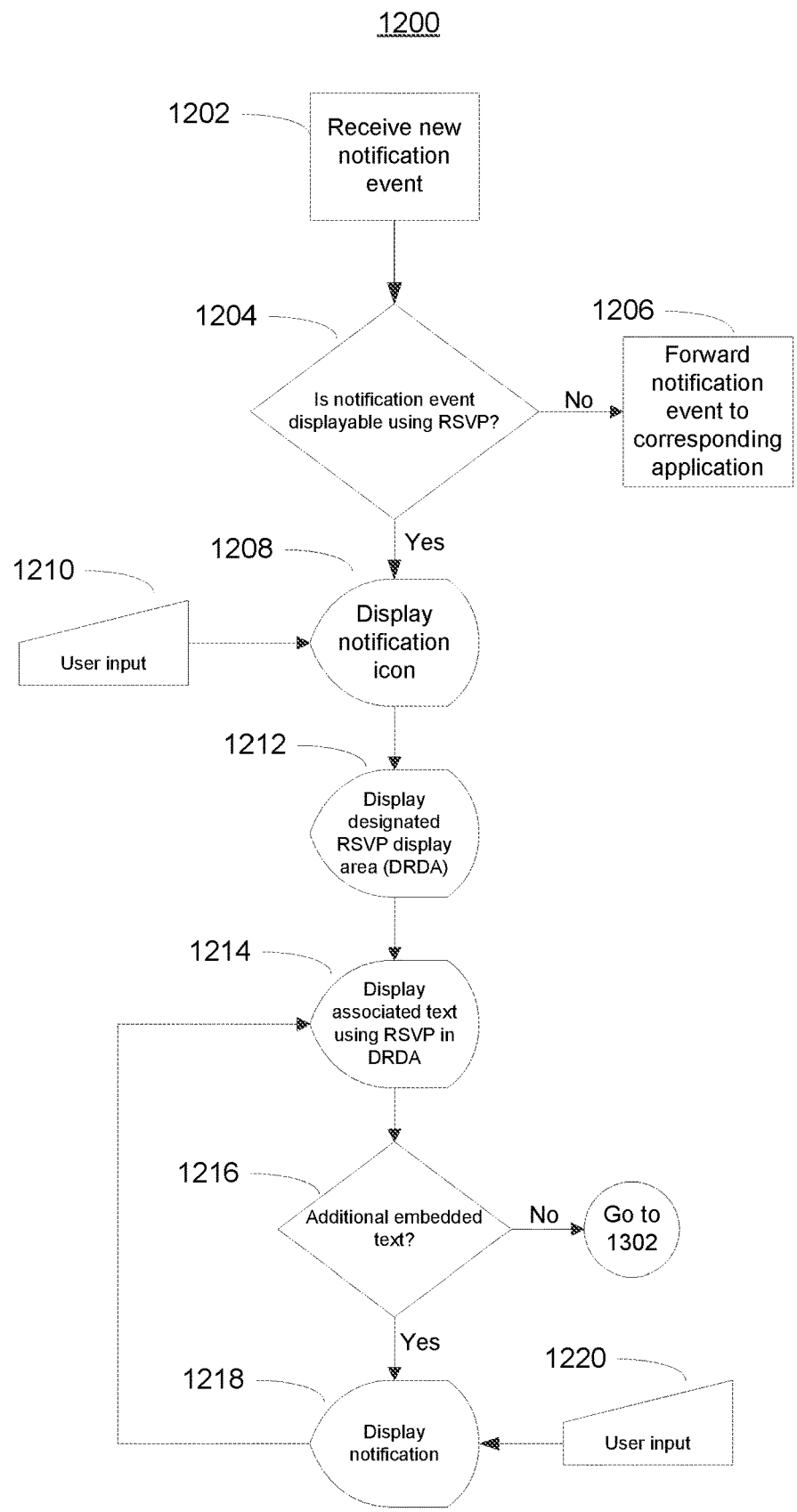
FIG. 12 is a flow chart diagram of a process of displaying RSVP content on a homescreen or desktop in accordance with one embodiment of the present invention.

FIG. 12 is a flowchart diagram of process 1200 for displaying RSVP content on a homescreen in accordance with one embodiment of the invention. A new notification event is received at step 1202. As previously described, a new notification event may include receipt of a new email message, SMS message, file transfer, etc. In one embodiment, the notification event may have been received as a result of a "push" notification. Alternatively, the notification event may have been received in response to a request from user device 210. It may be determined in step 1204 if the notification event is displayable using RSVP. In one embodiment, this determination includes determining if the corresponding application allows display of content using RSVP. For instance, as a result of user settings, certain applications may have disabled or may not allow displaying content using RSVP. If it is determined that the notification event is not displayable using RSVP, the notification event is forwarded to the corresponding application in step 1206, which may handle the notification event in the conventional manner. For example, if the notification is for a SMS message, the notification is forwarded to the SMS application, if it for an email message, it is forwarded to the email application, etc.

However, if the notification event is determined to be displayable using RSVP, a notification marker/icon may be displayed in step 1208. In one embodiment, the notification marker/icon may be overlaid on top of the icon representing the corresponding application (see, FIG. 4b). In other embodiments the notification marker/icon may be displayed adjacent to, above or below the icon representing the corresponding application. As previously described, the notification marker/icon may also include a numerical indicator, which may correspond to the number of notification events for the corresponding application. The notification marker/icon may be selected in response to user input received at step 1210. The user input may include, for example a touch and hold of the notification marker/icon, a tap of the notification marker/icon, a selection of the notification marker/icon using a mouse or trackball, etc. As previously discussed, in some embodiments, a notification marker/icon may be selected by simply "hovering" over the notification marker/icon. In response to user selection of the notification marker/icon, the designated RSVP display area (DRDA) may be displayed in step 1212. Textual content associated with the notification event may be displayed using RSVP in the DRDA in step 1214. In one embodiment, the textual content associated with the notification event may be displayed in the DRDA as long as appropriate user input is present. For example, in the case where appropriate user input is a press and hold of the notification icon/marker, if the user releases the notification icon/marker, the DRDA stops displaying the RSVP content and is then hidden. In one embodiment, the amount and type of content that gets displayed in DRDA may be defined or selected in RSVP Settings 308 (FIG. 3). For example, in the case of an email, it may be selected that the sender name, subject of the email and the body of the email may be displayed using RSVP in DRDA. Alternatively, it may be selected that only the sender name and subject of the email be displayed using RSVP in DRDA. In some embodiments, RSVP content may contain additional embedded RSVP content as illustrated in, for example FIGS. 7a-7h. It may be determined in step 1216 if additional embedded text is present. If so, a notification (e.g., notification 704 in FIG. 7d) may be displayed in step 1218. In response to user input received at step 1220, the additional embedded text may be displayed in DRDA using RSVP. In some embodiments, steps 1218 and 1220 may be optional. In other words, all available RSVP content may be automatically displayed sequentially without awaiting user input.

Figure 13:
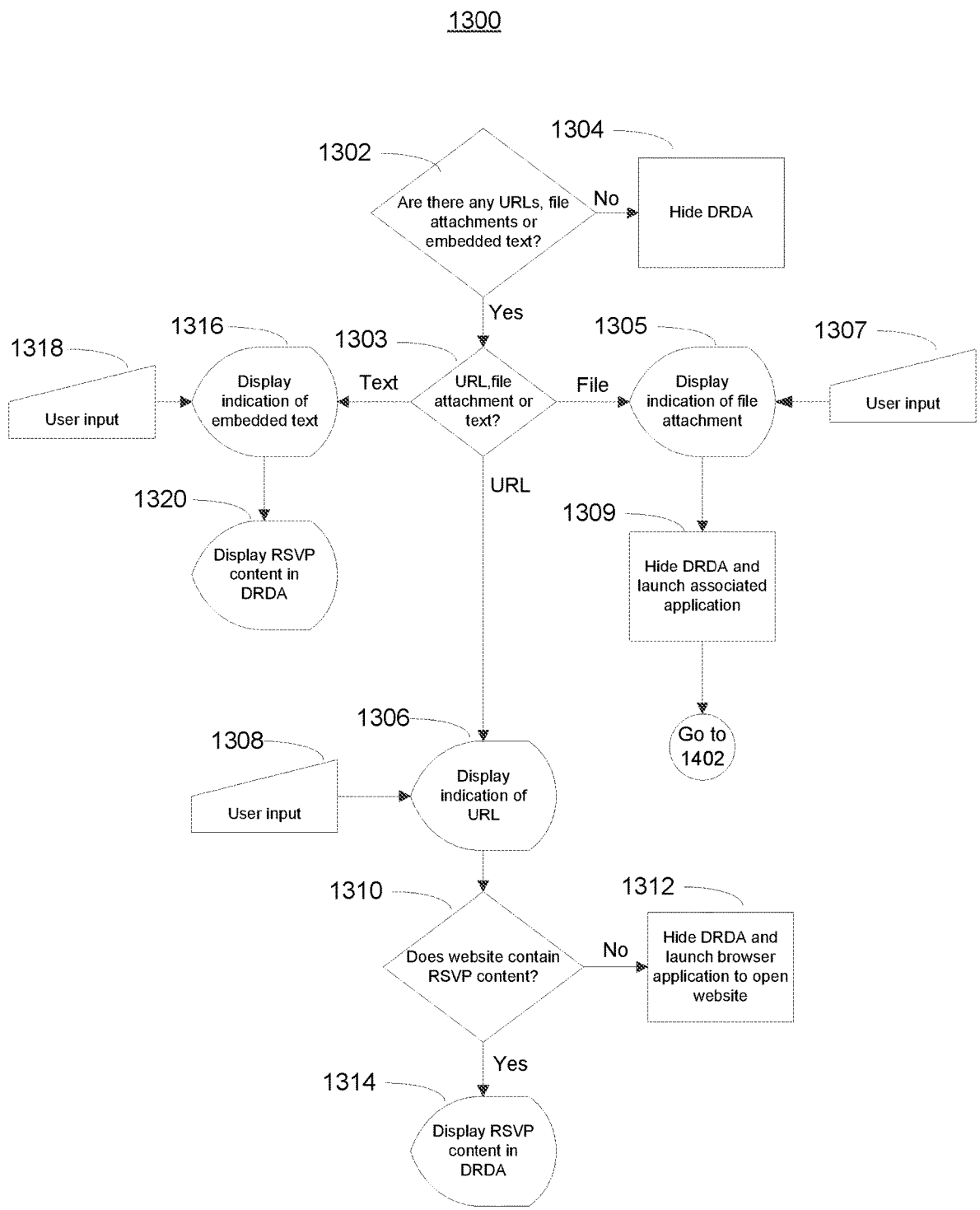
FIG. 13 is a flow chart diagram of a process of displaying RSVP content included in file attachments, embedded text, and URLs in accordance with one embodiment of the present invention.

FIG. 13 is a flowchart diagram of process 1300 for displaying embedded text (see e.g., FIG. 7d), an attachment and/or URL included with RSVP content in accordance with one embodiment of the invention. Upon completion of displaying RSVP content, which may or may not have been associated with a notification event, it is determined in step 1302 whether the RSVP content includes embedded text, an attachment and/or a URL. If the RSVP content is determined to not include embedded text, an attachment and/or a URL, the DRDA is hidden in step 1304. If the RSVP content is determined to include embedded text, an attachment and/or a URL, it is determined in step 1303 whether embedded text, a file attachment or a URL is included. If it is determined that a file attachment is included, an indication of the presence of an attachment is displayed in step 1305 (as shown in FIG. 6a). The file attachment may be, for example a photo, a map, a document, etc. User input indicating selection of the file attachment is received in step 1307. In step 1309, the DRDA is hidden and the application associated with the file attachment is launched to open the attachment. For example, if the file attachment is a photo, a photo viewer application may be launched to open the photo. In one embodiment, the file attachment itself may contain embedded RSVP content. The process of opening a file which may contain RSVP content and displaying the RSVP content within an application interface is described in more detail in the description of FIG. 14a.

If it is determined in step 1303 that a URL is included in the RSVP content, an indication of the presence of a URL is displayed in step 1306 (as shown in FIG. 6b). User input indicating selection of the URL is received in step 1308. In one embodiment, the webpage corresponding to the URL may contain RSVP content. As previously described, RSVP content may be embedded in a webpage using, for example a <meta> HTML tag. It is determined in step 1310 if the webpage corresponding to the URL contains RSVP content. If it is determined that the webpage does not contain RSVP content, the DRDA is hidden and a browser application is launched in step 1312 to display the webpage corresponding to the URL. If, however, the webpage is determined to contain RSVP content, the RSVP content is displayed in the DRDA using RSVP in step 1314.

If it is determined in step 1303 that embedded text is included in the RSVP content, an indication of the presence of embedded text is displayed in step 1316 (as shown in FIG. 7d). User input indicating selection of the embedded text is received in step 1318. In step 1320, the RSVP content is displayed in the DRDA using RSVP.

Figure 14A:
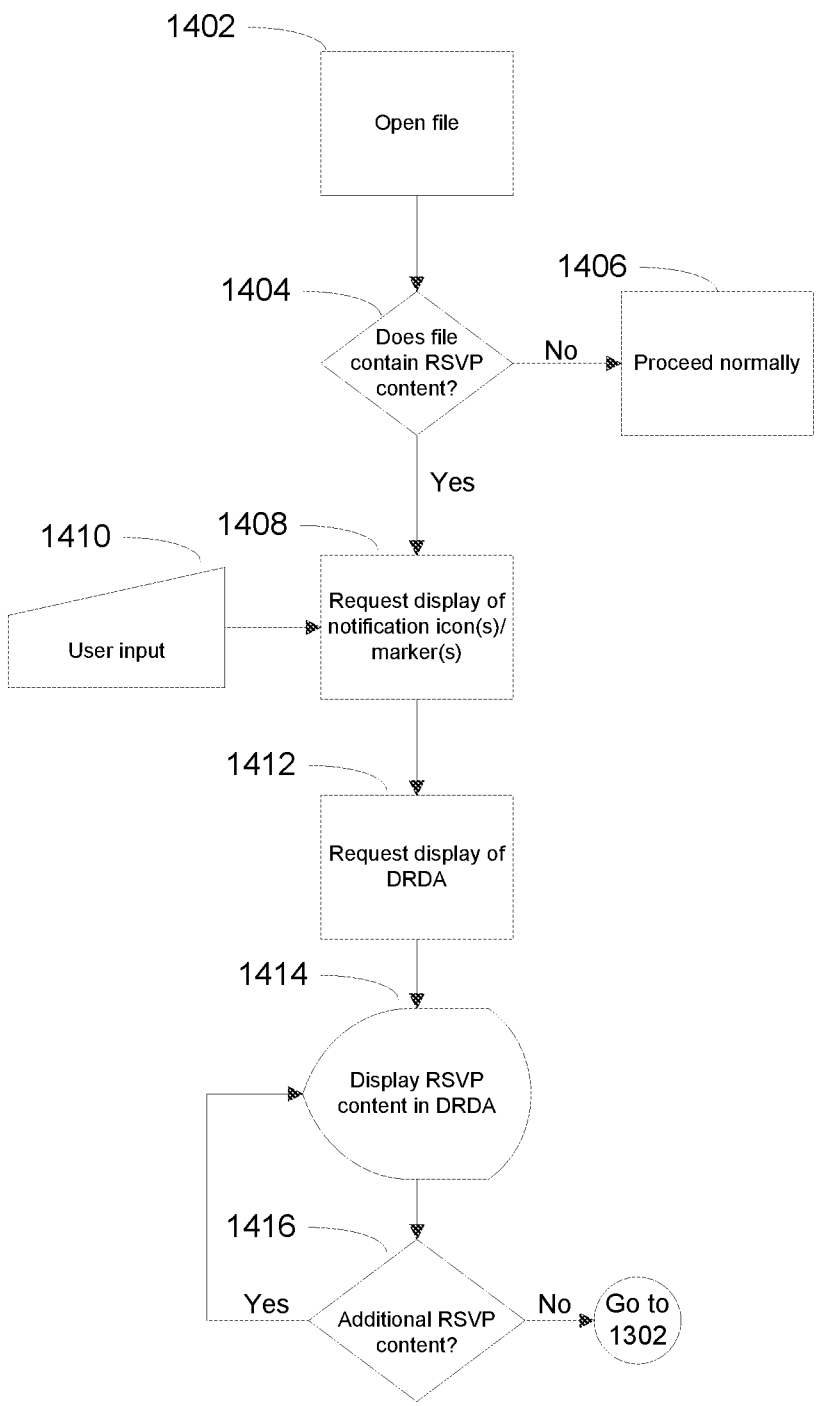
FIG. 14a is a flow chart diagram of a process of displaying RSVP content within an application in accordance with one embodiment of the present invention.

FIG. 14a is a flowchart diagram of process 1400 for displaying, within an application, RSVP content that is embedded in a file in accordance with one embodiment of the present invention. For example, process 1400 may be used by a photo application to display a photo which contains embedded RSVP content, or by a browser application to display an advertisement which contains embedded RSVP content, etc. In step 1402, the file may be opened by the application. In step 1404, it may be determined if the file contains RSVP content (e.g., content that is configured to be displayed using RSVP). In one embodiment, this determination may be made by RSVP library 204 (FIG. 2). The application may request RSVP library 204 to determine if the file includes RSVP content. In one embodiment, RSVP library 204 may detect the presence of RSVP content by searching the contents of the notification event for meta data, such as a <meta> tag in HTML pages, EXIF data in photos, etc. In another embodiment, the application may include application specific RSVP software (e.g., 209a-209c in FIG. 2), which may determine if the file contains RSVP content.

If it is determined that the file contains no RSVP content, the application may proceed as normal in step 1406. For example, if the file is a photo, and it does not contain RSVP content, the application may simply display the photo normally. If however, it is determined that the file contains RSVP content, the application requests display of notification markers/icons in appropriate locations in step 1408. In the example of a photo, the notification markers/icons may need to be displayed in specific locations on the photo. In one embodiment, the application may request, for example, RSVP library 204 to display the notification markers/icons. In another embodiment, the application may request the operating system to display the notification markers/icons. In yet another embodiment, the application may obtain the notification markers/icons from RSVP library 204, and display the notification markers/icons. In an alternate embodiment, step 1408 of displaying notification markers/icons is optional. A user device may be configured (e.g., using RSVP settings 308 in FIG. 3) such that certain applications may display all content using RSVP. For example, applications such as an email application, a SMS application, etc. which primarily receive textual data, may be configured to display all content using RSVP. In such instances, displaying a notification marker/icon indicating the presence of RSVP content is not necessary as further described with respect to FIG. 14*b*.

Continuing with the description of FIG. 14*a*, upon receiving user input comprising selection of a particular notification marker/icon at step 1410, the application may request display of the DRDA in step 1412. In one embodiment, the application may request, for example RSVP library 204 to display the DRDA. In another embodiment, the application may request the operating system to display the DRDA. In yet another embodiment, the application may itself (e.g., using RSVP software 209*a*-209*c* in FIG. 2) display the DRDA. The RSVP content associated with the user selected notification marker/icon may be displayed in the DRDA using RSVP in step 1414. It is determined in step 1416 if additional RSVP content is present. If so, the additional RSVP content may be automatically displayed sequentially. For example, as shown in FIGS. 7*a*-7*c* and 8*a*-8*d*, if there are multiple notification markers/icons, DRDA may automatically sequentially display the RSVP content associated with each marker/icon. In another embodiment, user input may be requested before displaying RSVP content associated with each marker/icon. As previously discussed, the RSVP content may include one or more attachments. After displaying RSVP content, process 1300 may be used to display any attachments included with the RSVP content.

Figure 14B:
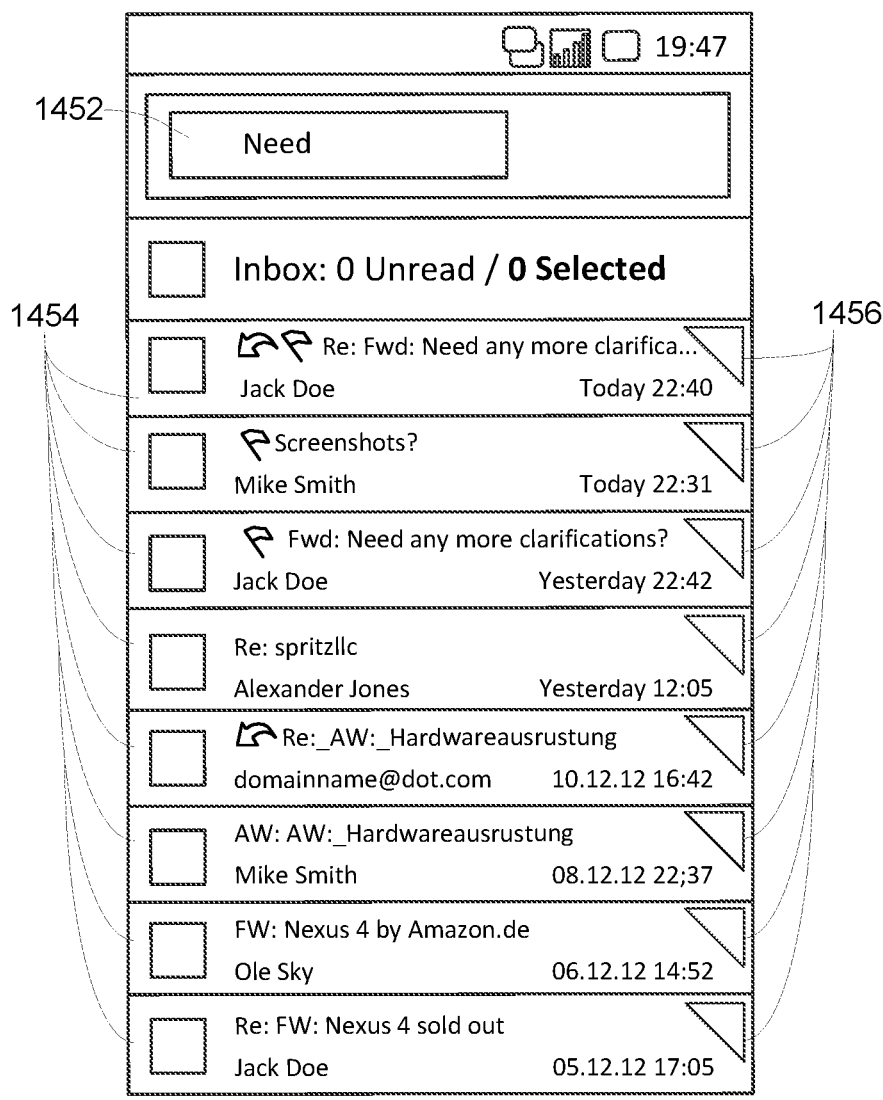
FIG. 14b is a screenshot diagram of an exemplary email application interface including a designated RSVP display area in accordance with one embodiment of the present invention.

FIG. 14*b* is a screenshot diagram 1450 of an exemplary email application on a mobile device in accordance with one embodiment of the present invention. Screenshot diagram 1450 shows a list of email items 1454 which are displayed in a user's inbox. In one embodiment, process 1400, as discussed above, may be employed by the email application to display the content of selected emails using RSVP. A user may select an email by for example, "touching and holding" an email item 1454. Upon user selection of an email, DRDA 1452 may be displayed, and the content of the email may be displayed in DRDA 1452 using RSVP. In one embodiment, the content displayed in DRDA 1452 may include the body of the email. Although notification markers/icons 1456 are shown, displaying notification markers/icons 1456 is optional. As discussed above, a user device may be configured (e.g., using RSVP settings 308 in FIG. 3) such that certain applications may display all content using RSVP. An email application, which primarily receives textual data, may display all content using RSVP. In such instances, displaying a notification marker/icon indicating the presence of RSVP content is not necessary. In one such example, an application may simply list item titles (e.g., emails) without using RSVP notification markers/icons and then, upon receipt of a particular user interface action (e.g., a tap and hold) with respect to an item, the application will display content of that item using RSVP in a DRDA while continuing to display at least a portion of the list of other items.

Figure 15:
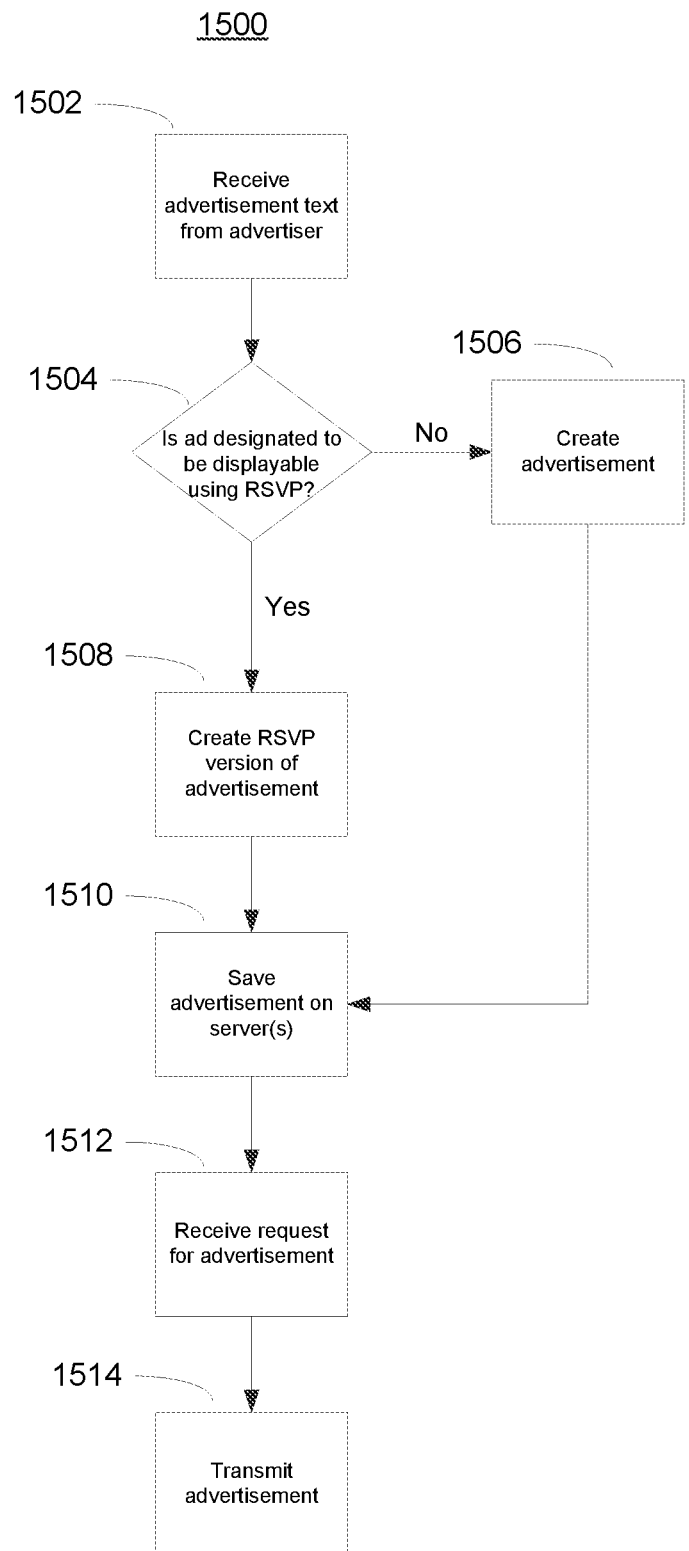
FIG. 15 is a flow chart diagram of a process of creating an RSVP version of an online advertisement in accordance with one embodiment of the present invention.

FIG. 15 is a flow chart diagram of process 1500 for creating an RSVP version of an online advertisement in accordance with one embodiment of the present invention. Online advertisers, who are looking to increase the amount of content that is presented to users in a given amount of screen space, may benefit from incorporating RSVP content into their advertisements. Textual information to be incorporated into an advertisement may be received from an advertiser in step 1502. It may be determined in step 1504, whether the advertiser would like to embed the textual information as RSVP content in the advertisement. If it is determined that the advertiser does not want to include RSVP content in the advertisement, a non-RSVP version of the advertisement may be created in step 1506. If it is determined that the advertisement is to include RSVP content, an RSVP version of the advertisement may be created in step 1508. The RSVP content may be configured using, for example meta-data tags as previously discussed. In step 1510, a RSVP or non-RSVP version of the advertisement may be saved on one or more servers. One or more servers may receive a request for an advertisement in step 1512. In one embodiment, the request may be from a browser application (e.g., for a banner advertisement). In another embodiment, the request may be from a desktop or mobile application which displays advertisements within its interface. In response to the request, the advertisement may be transmitted to the application in step 1514. In one embodiment, when the advertisement is received by the application, process 1400 may be used to display the advertisement. In one embodiment, the advertisement may be displayed with one or more notification markers/icons similar to those shown in FIG. 4*b*, 8*a*, 9*a*, or 10*a* to indicate the presence of content that is displayable using RSVP. The notification markers/icons may be overlaid on top of the advertisement, or may be displayed adjacent to, above, or below the advertisement.

Figure 16:
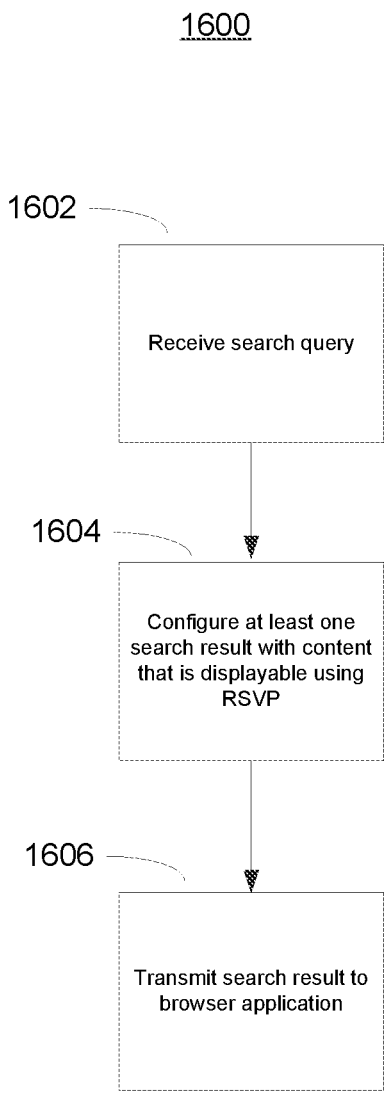
FIG. 16 is a flow chart diagram of a process of configuring search results with RSVP content in accordance with one embodiment of the present invention.

In addition to display advertisements, RSVP content may also be incorporated in, for example sponsored search results. FIG. 16 is a flow chart diagram of a process 1600 for configuring search results with RSVP content in accordance with one embodiment of the present invention. One or more servers may receive a search query in step 1602. In response to the search query, at least one search result corresponding to the search query may be configured with content that is displayable using RSVP in step 1604. In step 1606, the at least one search result may be transmitted to a browser application for display in the browser application. In one embodiment, the search result(s) may be displayed as shown in FIGS. 10*a*-10*c*.

Figure 17:
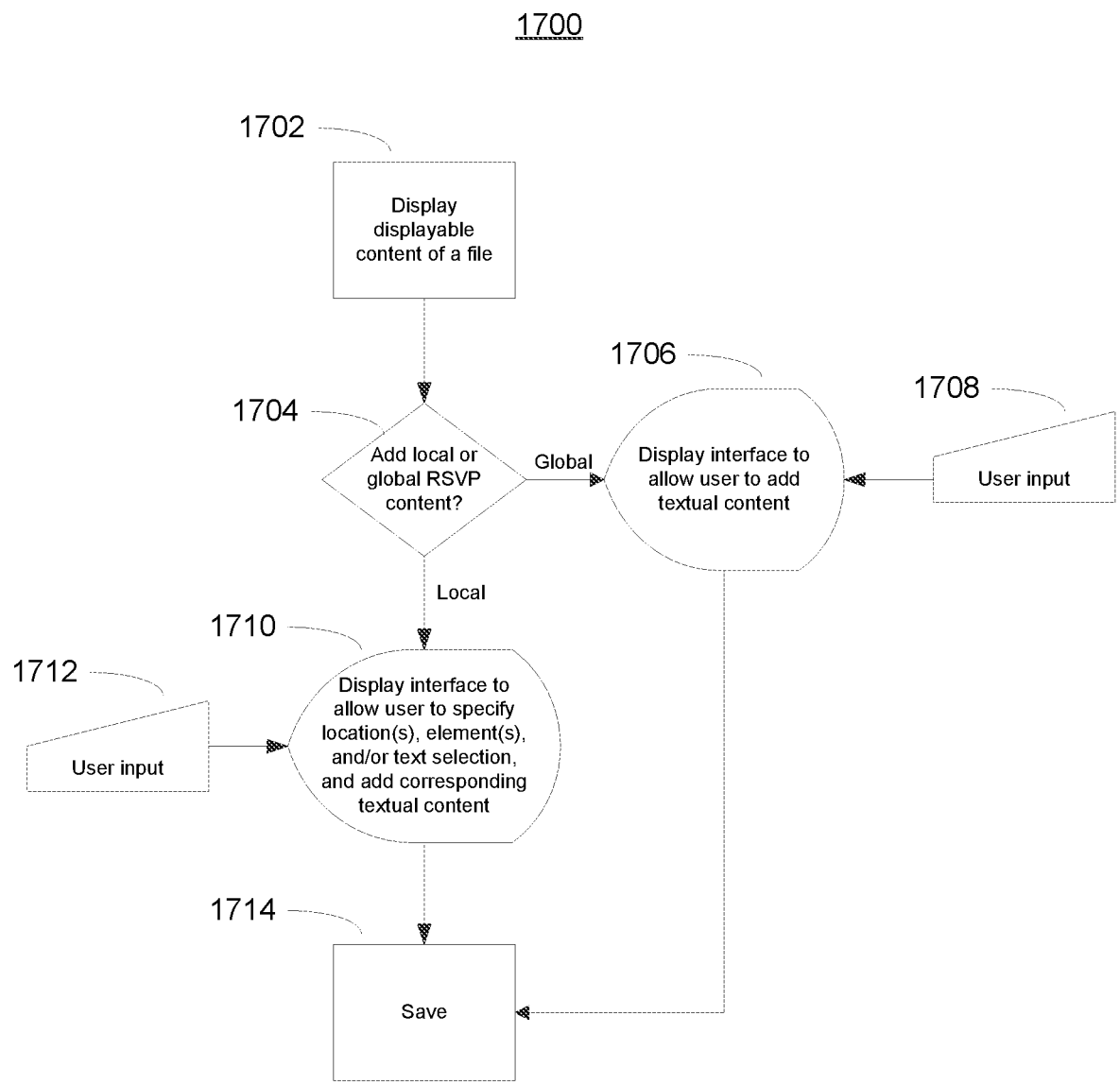
FIG. 17 is a flow chart diagram of a process of embedding RSVP content in a file in accordance with one embodiment of the present invention.

In some embodiments, users may embed RSVP content into files such as for example, photos, presentations, maps, etc. FIG. 17 is a flow chart diagram of a process 1700 for embedding RSVP content in a file (e.g., map, photo, diagram, presentation, word processing document, spreadsheet, etc.) in accordance with one embodiment of the present invention. In step 1702, displayable contents of a file may be displayed by the appropriate application. For example, a diagram may be displayed in a drawing application (e.g., Microsoft Visio™), or a presentation may be displayed in a presentation application (e.g., Microsoft PowerPoint™). In some embodiments, the application may be a desktop application while in other embodiments, the application may be a mobile application, or a web based application accessible via a browser. A user may specify whether to add "global" RSVP content or "local" RSVP content in step 1704. In one embodiment, an interface which allows the user to choose between "global" and/or "local" RSVP content may be displayed. In some embodiments, both "local" and "global" RSVP content may be embedded. As used herein, "global" content refers to RSVP content associated with the file (e.g., photo, map, presentation, and/or diagram) in its entirety. In the case of a map, in the example shown in FIG. 8*b*, notification 802 indicates presence of "global" RSVP content, such as "Check out these three restaurants" and is associated with the whole displayed map. By contrast, notifications 804, 806, and 808 indicate presence of "local" RSVP content associated with each location specified by notifications 804, 806, and 808. Similarly, in the case of a photo, in the example shown in FIG. 9*a*, notification 902 indicates presence of "global" RSVP content, such as "These are my friends," and is associated with the whole photo. By contrast, notifications 904 and 906 indicate presence of "local" RSVP content associated with each location specified by notifications 904 and 906. In another embodiment, "global" content may include a description of the file's contents. In such an embodiment, selecting a file (e.g., by clicking on, or "hovering" over the file's icon or name) that includes embedded "global" RSVP content from a file management interface (e.g., Windows Explorer™) or a homescreen may result in the "global" content being displayed using RSVP. It should be noted that in such an embodiment, viewing the "global" RSVP content does not require opening the file with an associated application.

If the user chooses to add "global" RSVP content, an interface which allows the user to input textual content, which will be embedded as "global" RSVP content is displayed in step 1706. In the embodiment described above where "global" content includes a description of the file, the "global" content may be provided in the metadata of the file. For example, a user may right-click the file icon, select an option to enter an RSVP description for the file, and input the textual content.

User input including textual content may be received in step 1708. In embodiments where text input is required, text input may be provided using a virtual (i.e., touch screen) or physical keyboard, mouse, trackball, etc. Alternatively, or in addition, the user may provide voice/speech input via a microphone. The voice/speech input may then be converted to text. If the user chooses to add "local" RSVP content, an interface which allows the user to specify location(s), element(s), and/or text selection, and add the corresponding textual content, which will be embedded as "local" RSVP content is displayed in step 1710. For example, the user may specify locations on photos, maps, etc., specify elements or objects in photos, diagrams and presentations, etc. User input including specified location(s), element(s), and/or text selection, and add the corresponding textual content may be received in step 1712. In one embodiment, the interface may also allow selection of text such that RSVP content may be associated with the selected text. In the case of a photo, in addition to specifying locations on the photo, the user may select areas of the photo, such as, for example a face of a person. The location(s), element(s), and/or text selection information and the corresponding textual content may be saved in step 1714. In one embodiment, location(s), element(s), and/or text selection information and the corresponding textual content may be saved in the meta data of the file. For example, in the case of a photo, the location(s), element(s), and/or text selection information and the corresponding textual content may be saved in the EXIF data. In one embodiment, the textual content may be saved as plain text, in which case, the textual data may be converted to RSVP content (e.g., text that is configured to be displayed using RSVP) prior to displaying. In other embodiments, the textual content may be converted to RSVP content, and the RSVP content may be saved in the meta data of the file.

Figure 18A:
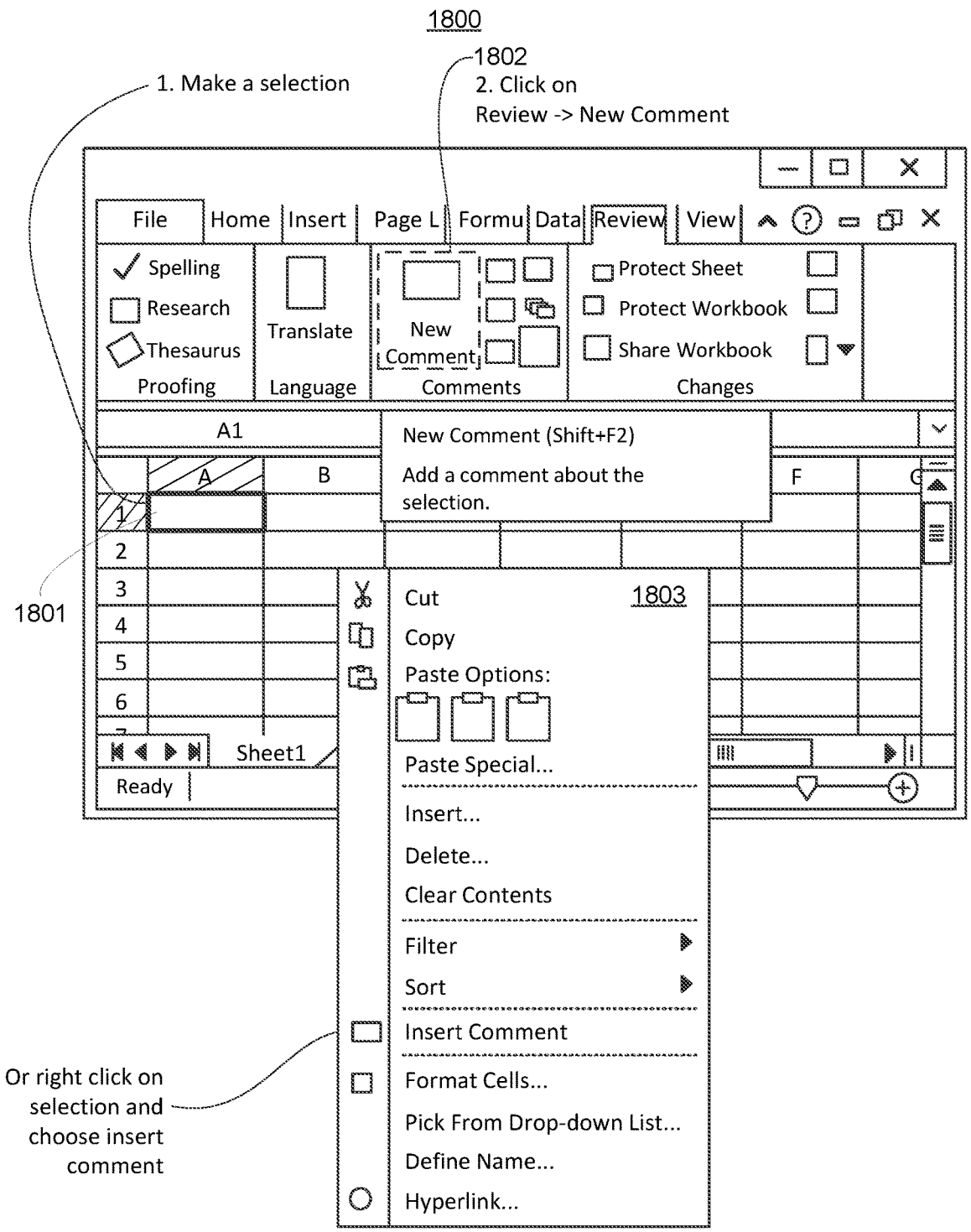
FIGS. 18a and 18b illustrate screenshot diagrams of an exemplary spreadsheet application interface illustrating a process of embedding RSVP content in a spreadsheet document in accordance with one embodiment of the present invention.
Figure 18B:
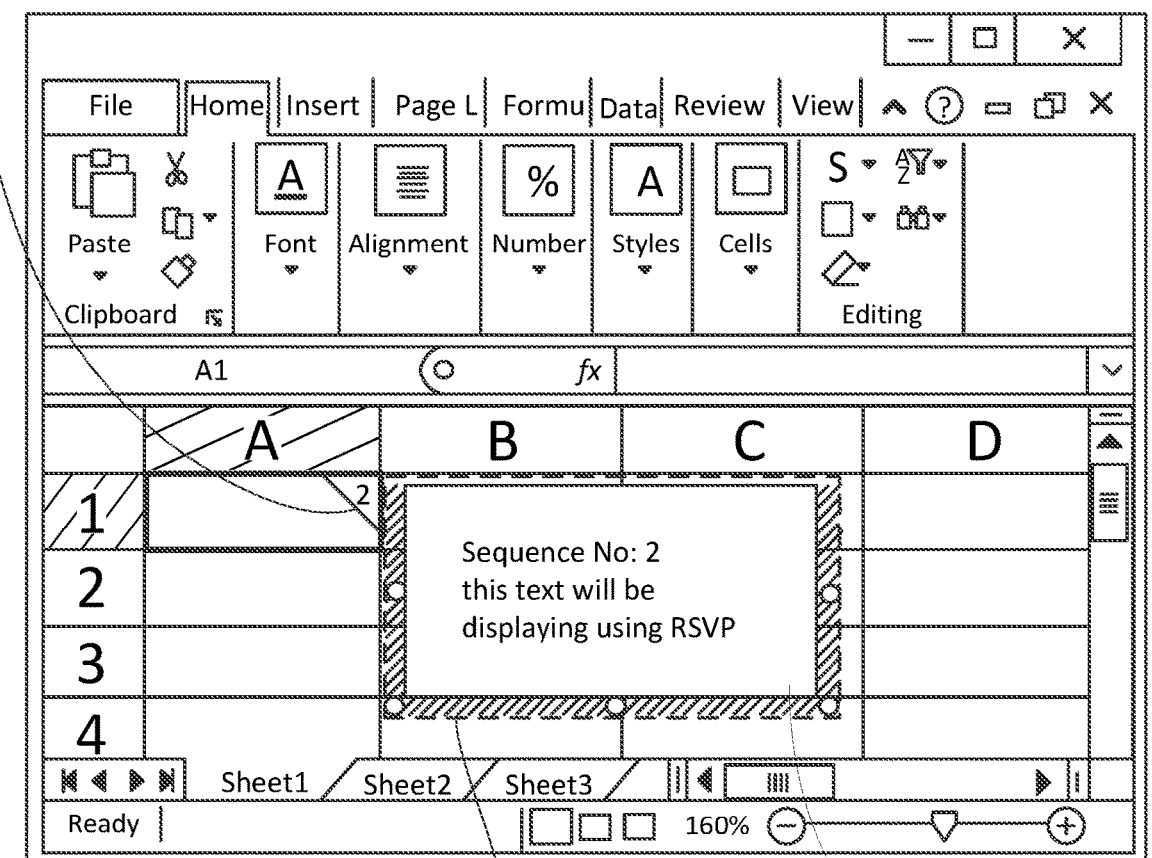

FIGS. 18*a* and 18*b* illustrate screenshot diagrams of an exemplary spreadsheet application interface illustrating a process of embedding RSVP content in a file such as for example, a spreadsheet document in accordance with one embodiment of the present invention. RSVP content may be embedded as a comment on any cell in a spreadsheet document. To embed RSVP content, a cell 1801 may be selected as shown in FIG. 18*a*. Once selected, a user may click on for example, "New Comment," icon 1802 or may right-click on the cell. Right-clicking on the cell may display a menu, from which "Insert Comment" may be selected. Selecting "New Comment" or "Insert Comment" may result in the display of input field 1804 as shown in FIG. 18*b*. The user may specify a sequence number for the comment, if any, and provide the text for the comment in input field 1804. The text entered into input field 1804 is displayable using RSVP. In one embodiment, the content of every cell and/or every comment corresponding to a cell may be displayable using RSVP. Optionally, a notification marker/ icon may be displayed indicating the presence of content or a comment including RSVP content. A process similar to that shown in FIGS. 18*a* and 18*b* may be used to embed RSVP content in a word processing document. For example, text may be selected, and a corresponding comment may be input by a user. The comment may then be embedded in the word processing document, and may subsequently be displayed in a DRDA using RSVP upon user selection of the comment.

FIG. 19 illustrates a screenshot diagram of an exemplary spreadsheet application interface including a designated RSVP display area in accordance with one embodiment of the present invention. Screenshot 1900 illustrates a spreadsheet application interface including DRDA 1904 displaying RSVP content that was embedded in the spreadsheet document. As shown, notification marker/icon 1902 indicates presence of RSVP content associated with the corresponding cell. In addition, notification marker/icon 1902 may also include a numerical indicator (not shown). Upon user selection of notification icon/marker 1902, DRDA 1904 may be displayed, and the corresponding RSVP content may be displayed in DRDA 1904. In one embodiment, the spreadsheet application may be configured to allow the content and/or comments corresponding to all cells to be displayed using RSVP whether or not an author has specially embedded content designated for RSVP display. In such an instance, notification markers/icons indicating presence of RSVP content may not be displayed. A user may for example, "touch and hold" a cell, and as a result, DRDA 1904 may be displayed. The corresponding content and/or comment may then be displayed using RSVP in DRDA 1904.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

The invention claimed is:

1. A method of providing an interface for a user device, the method comprising:
enabling the user device to cause display of an interface, the interface comprising a plurality of icons associated with applications;
enabling the user device to receive a user interface action selecting a selectable item from the plurality of icons;
enabling the user device to cause display, in response to the user interface action, of a designated display area while display continues of at least a portion of the plurality of icons; and
enabling the user device to cause display in the designated display area, in response to the user interface action, of content corresponding to the selected item using rapid serial visual presentation (RSVP), while display continues of at least a portion of the plurality of icons, wherein display of the content corresponding to the selected item using RSVP comprises sequentially displaying respective display elements comprising respective portions of the content such that a predetermined position of a respective display element is displayed at a fixed display location, and further wherein each respective portion of the content fits within a perceptual span of 20 characters or less, each respective portion including a subset of the content.

2. The method of claim 1, further comprising:
enabling the user device to cause display of a first icon representing a notification event associated with an application by displaying the first icon with an icon representing the application, wherein the first icon further indicates a presence of content that is displayable using rapid serial visual presentation (RSVP);
enabling the user device to receive a first user interface action selecting the notification event; and
enabling the user device to, in response to the first user interface action, display textual content associated with the notification event in a designated display area using RSVP.

3. The method of claim 2, further comprising:
enabling the user device to cause display of a second icon, different from the first icon, by displaying the second icon with the icon representing the application subsequent to displaying the textual content associated with the notification event, wherein the second icon represents a read notification event.

4. The method of claim 2, wherein the first icon further comprises a numerical indicator.

5. The method of claim 2, wherein the first icon further indicates a quantity of notification events.

6. The method of claim 2, wherein displaying the first icon with the icon representing the application comprises connecting at least a part the first icon with at least a part of the icon representing the application.

7. The method of claim 3, wherein the second icon modifies the first icon.

8. The method of claim 3 wherein displaying the second icon comprises displaying the first icon in a different color.

9. The method of claim 2, wherein the first user interface action comprises tapping the icon representing the application on a touch surface of the user device.

10. The method of claim 2, wherein the first user interface action comprises touching and holding the icon representing the application on a touch surface of the user device.

11. The method of claim 2, wherein the first user interface action comprises touching and swiping the icon representing the application in a predetermined direction on a touch surface of the user device.

12. The method of claim 2, further comprising:
enabling the user device to determine if the notification event includes an attachment; and
enabling the user device to cause display, if the notification event includes an attachment, of a notification indicating the presence of the attachment.

13. The method of claim 12, further comprising:
enabling the user device to receive a second user interface action selecting the notification; and
enabling the user device to launch an application associated with the attachment in response to the second user interface action.

14. The method claim 2, further comprising:
enabling the user device to determine if the notification event includes a URL; and
enabling the user device to cause display, if the notification event includes a URL, of a notification indicating the presence of the URL.

15. The method of claim 14, further comprising:
enabling the user device to receive a second user interface action selecting the notification; and
enabling the user device to determine if a webpage corresponding to the URL includes content configured to be displayed using RSVP.

16. The method of claim 15, further comprising:
enabling the user device to cause display, if the webpage includes content configured to be displayed using RSVP, of the content using RSVP in the designated display area.

17. The method of claim 15, further comprising:
enabling the user device to cause to launch, if the webpage does not include content configured to be displayed using RSVP, a browser application to display the webpage.

18. The method of claim 2, further comprising:
enabling the user device to determine if the notification event includes at least one additional level of embedded text; and
enabling the user device to cause display, if the notification event includes at least one additional level of embedded text, of a notification indicating the presence of the embedded text.

19. The method of claim 18, further comprising:
enabling the user device to receive a second user interface action selecting the notification; and
enabling the user device to cause display of the embedded text using RSVP in the designated display area in response to the second user interface action.

20. A computer program product in a non-transitory computer readable medium including instructions executable by a processor of a user device for at least:
enabling the user device to cause display of an interface, the interface comprising a plurality of icons associated with applications;
enabling the user device to receive a user interface action selecting a selectable item from the plurality of icons;
enabling the user device to cause display, in response to the user interface action, of a designated display area while display continues of at least a portion of the plurality of icons; and
enabling the user device to cause display in the designated display area, in response to the user interface action, of content corresponding to the selected item using rapid serial visual presentation (RSVP), while display continues of at least a portion of the plurality of icons, wherein display of the content corresponding to the selected item using RSVP comprises sequentially displaying respective display elements comprising respective portions of the content such that a predetermined position of a respective display element is displayed at a fixed display location, and further wherein each respective portion of the content fits within a perceptual span of 20 characters or less, each respective portion including a subset of the content.

21. The computer program product of claim 20, wherein the instructions are also for at least:

enabling the user device to cause display of a first icon representing a notification event associated with an application by displaying the first icon with an icon representing the application, wherein the first icon further represents a presence of content that is displayable using rapid serial visual presentation (RSVP);

enabling the user device to receive a first user interface action selecting the notification event; and enabling the user device to, in response to the first user interface action, display textual content associated with the notification event in a designated display area using RSVP.

22. The computer program product of claim 21, wherein the instructions are also for at least:

enabling the user device to determine if the notification event includes an attachment; and enabling the user device to cause display, if the notification event includes an attachment, of a notification indicating the presence of the attachment.

23. The computer program product of claim 22, wherein the instructions are also for at least:

enabling the user device to receive a second user interface action selecting the notification; and enabling the user device to launch an application associated with the attachment in response to the second user interface action.

24. The computer program product claim 21, wherein the instructions are also for at least:

enabling the user device to determine if the notification event includes a URL; and enabling the user device to cause display, if the notification event includes a URL, of a notification indicating the presence of the URL.

25. The computer program product of claim 24, wherein the instructions are also for at least:

enabling the user device to receive a second user interface action selecting the notification; and enabling the user device to determine if a webpage corresponding to the URL includes content configured to be displayed using RSVP.

26. The computer program product of claim 25, wherein the instructions are also for at least:

enabling the user device to cause display, if the webpage includes content configured to be displayed using RSVP, of the content using RSVP in the designated display area.

27. The computer program product of claim 25, wherein the instructions are also for at least:

enabling the user device to launch, if the webpage does not include content configured to be displayed using RSVP, a browser application to display the webpage.

28. The computer program product of claim 21, wherein the instructions are also for at least:

enabling the user device to determine if the notification event includes at least one additional level of embedded text; and enabling the user device to cause display, if the notification event includes at least one additional level of embedded text, of a notification indicating the presence of the embedded text.

29. The computer program product of claim 28, wherein the instructions are also for at least:

enabling the user device to receive a second user interface action selecting the notification; and enabling the user device to cause display of the embedded text using RSVP in the designated display area in response to the second user interface action.

30. A user device comprising:

means for causing a displaying of an interface, the interface comprising a plurality of icons associated with applications;

means for receiving a user interface action selecting a selectable item from the plurality of icons;

means for causing a displaying, in response to the user interface action, of a designated display area while display continues of at least a portion of the plurality of icons; and means for causing a displaying, in the designated display area, in response to the user interface action, of content corresponding to the selected item using rapid serial visual presentation (RSVP), while display continues of at least a portion of the plurality of icons, wherein display of the content corresponding to the selected item using RSVP comprises sequentially displaying respective display elements comprising respective portions of the content such that a predetermined position of a respective display element is displayed at a fixed display location, and further wherein each respective portion of the content fits within a perceptual span of 20 characters or less, each respective portion including a subset of the content.

* * * * *